United States Patent
Negishi et al.

(10) Patent No.: US 7,515,290 B2
(45) Date of Patent: Apr. 7, 2009

(54) PRINT PROCESSING APPARATUS, PRINT PROCESSING METHOD, SYSTEM CONTROL METHOD, PROGRAM, AND STORAGE MEDIUM

(75) Inventors: Akira Negishi, Kanagawa (JP); Kazuhiko Ushiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 10/939,826

(22) Filed: Sep. 13, 2004

(65) Prior Publication Data
US 2005/0068547 A1 Mar. 31, 2005

(30) Foreign Application Priority Data
Sep. 29, 2003 (JP) ............................. 2003-337522
Jul. 30, 2004 (JP) ............................. 2004-223300

(51) Int. Cl.
*G06F 3/12* (2006.01)
(52) U.S. Cl. .................... 358/1.15; 358/1.13; 358/1.14; 710/8; 710/13; 710/29; 709/232; 271/287; 399/366
(58) Field of Classification Search ................. 709/220; 271/287; 713/164; 399/366; 726/34, 5; 358/1.13–1.15
See application file for complete search history.

(56) References Cited

U.S. PATENT DOCUMENTS

| | | | | |
|---|---|---|---|---|
| 5,081,595 A * | 1/1992 | Moreno et al. | ............. | 358/1.12 |
| 5,306,102 A * | 4/1994 | Ota | ............. | 400/76 |
| 5,638,511 A * | 6/1997 | Nezu | ............. | 726/5 |
| 5,937,149 A * | 8/1999 | Lindner et al. | ............. | 358/1.14 |
| 6,433,881 B1 * | 8/2002 | Lynch et al. | ............. | 358/1.13 |
| 6,498,658 B1 * | 12/2002 | Sekikawa | ............. | 358/1.16 |
| 6,553,431 B1 * | 4/2003 | Yamamoto et al. | ............. | 710/8 |
| 7,084,997 B2 * | 8/2006 | Clough | ............. | 358/1.15 |
| 2002/0113998 A1 * | 8/2002 | Fujinawa | ............. | 358/1.15 |
| 2003/0206314 A1 * | 11/2003 | Tanimoto | ............. | 358/1.15 |
| 2004/0021892 A1 * | 2/2004 | Ueda | ............. | 358/1.14 |
| 2004/0153530 A1 * | 8/2004 | Machida | ............. | 709/220 |

FOREIGN PATENT DOCUMENTS

JP       2001-134515        5/2001

OTHER PUBLICATIONS

JP 2001-134515 English Translation.*

* cited by examiner

*Primary Examiner*—Mark K Zimmerman
*Assistant Examiner*—Dennis Dicker
(74) *Attorney, Agent, or Firm*—Canon U.S.A. Inc., I.P. Division

(57) ABSTRACT

A CPU of an image forming apparatus, such as a color electrophotographic copying apparatus, reads print step information from a memory, such as a USB memory, that stores print image data and print step information relating to a plurality of print steps for producing a print of the print image data and a progress state of the print steps. The CPU updates the progress state of the print steps stored in the memory subsequent to the print step being performed by a printer in the image forming apparatus, displays a next print step to perform based on the read print step information, and controls the printer. The image forming apparatus thus avoids leaks of the print data, and prevents useless printing and erratic job processing. Thus, even an inexperienced operator can provide sophisticated high quality print service using the image forming apparatus.

22 Claims, 15 Drawing Sheets

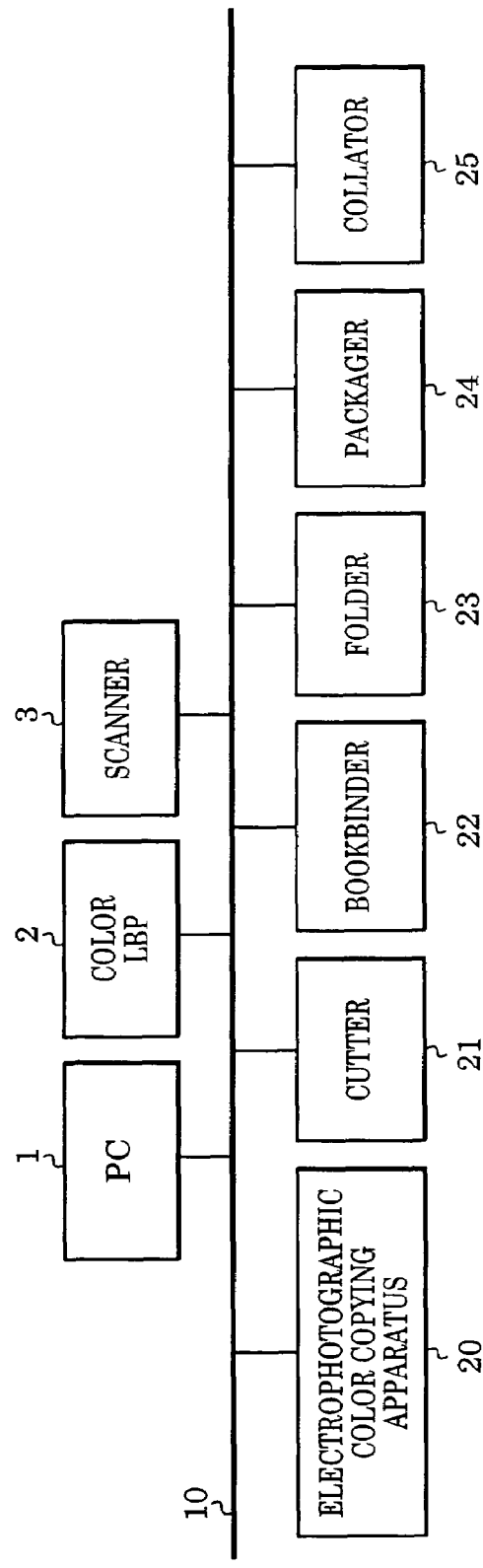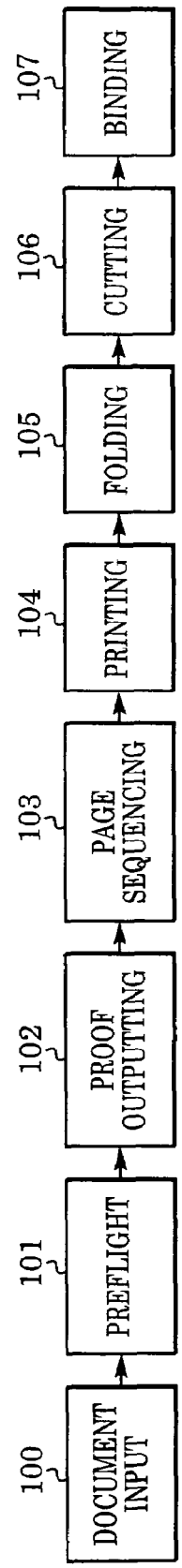

FIG. 7

| PROCESS STEP ID | JOB ITEM |
|---|---|
| 1 | DOCUMENT INPUT |
| 2 | DOCUMENT CHECKING |
| 3 | JOB SLIP INPUT |
| 4 | DOCUMENT BRIEFING |
| 5 | PROGRESS SCHEDULE CHART MAKING |
| 6 | PHOTOGRAPH TRIMMING |
| 7 | SCANNING |
| 8 | DTP EDITING |
| 9 | PREFLIGHT |
| 10 | PROOF OUTPUTTING |
| 11 | PAGE SEQUENCING |
| 12 | RIP |
| 13 | CTP OUTPUT |
| 14 | PLATE SETTING |
| 15 | PRINTING |
| 16 | PRINTOUT CHECKING |
| 17 | FULL PRINTING |
| 18 | CUTTING |
| 19 | FOLDING |
| 20 | COLLATING |
| 21 | GATHERING |
| 22 | BINDING |
| 23 | THREE-SIDE TRIMMING |
| 24 | PACKING |
| 25 | DELIVERY |

FIG. 14

NOTE!

· PACKAGING STEP BY PACKAGER IS NOT PERFORMED IN THIS JOB.

· NEXT IS FOLDING STEP.

· PERFORM FOLDING STEP WITH USB MEMORY AND SHEETS OF PAPER SET IN FOLDER

NOTE!

· IN THIS JOB, FOLDING STEP MUST BE PERFORMED PRIOR TO CUTTING JOB BY CUTTER

· PERFORM FOLDING JOB WITH USB MEMORY AND SHEETS OF PAPER SET IN FOLDER

· FOLDING STEP IS COMPLETE

· REMOVE USB MEMORY FROM FOLDER

· NEXT IS CUTTING STEP.
  PERFORM CUTTING STEP WITH USB MEMORY AND SHEET OF PAPER SET IN CUTTER

OK

MEMORY MAP OF STORAGE MEDIUM

PRINT PROCESSING APPARATUS, PRINT PROCESSING METHOD, SYSTEM CONTROL METHOD, PROGRAM, AND STORAGE MEDIUM

CROSS REFERENCE TO RELATED APPLICATIONS

This application claims the benefit of Japanese Application 2003-337522, filed Sep. 29, 2003, and Japanese Application 2004-223300, filed Jul. 30, 2004, the entire contents of which are incorporated herein by references.

BACKGROUND OF THE INVENTION

1. Field of the Invention

The present invention relates to a print processing apparatus, a print processing method, a system, a control method, a program, and a storage medium for use in an on-demand printing system for printing an ordered document requiring high confidentiality.

2. Description of the Related Art

It is expected today that operators in a printing business receive print data from a client in a removable medium, such as a magneto-optical disk.

For example, Japanese Patent Laid-Open No. 2001-134515 discloses a technique of providing a pay service of recording information, such as information supplied in a portable type storage medium, including providing a printout of the information and storage of the information onto a storage medium.

Along with widespread use of broadband network, receiving data online is also studied.

USB (universal serial bus) flash memories have become more widely accepted as a convenient device for transferring data.

Since personal computers (PCs) are currently supplied with an OS (operating system) and a USB interface (I/F) as standard, the PC reads information from and writes information to the USB flash memory without the need for installing a particular driver software. The USB flash memory is thus a very convenient and compact removable medium.

The USB flash memory is increasing the capacity thereof to 128 MB to 256 MB, and access control technique using a password is also studied.

When a document requiring a high degree of confidentiality, such as an operator's manual or catalogs for a new and unpublished product, is printed, the print data must be controlled so that it is not leaked, and the printouts must be handled with care.

In order to maintain this high degree of confidentiality, printers typically isolate the print confidential order sheet from general print order sheets, and a skilled operator processes the confidential document.

Heretofore, a control process has not been available under which even an operator at a low skill level can manage a plurality of print steps which are different depending on the request of a client, in an error free manner to print a document requiring confidentiality in accordance with an order sheet, while maintaining confidentiality. Even if a similar technique is available, a system or apparatus that fully satisfies a variety of needs, assures the ease of use, and permits smooth management is not available.

SUMMARY OF THE INVENTION

A print processing apparatus, a print processing method, a system, a control method, a program, and a storage medium free from the previously discussed drawbacks are disclosed.

The present invention provides a print processing apparatus, a print processing method, a system, a control method, a program, and a storage medium for constructing a system that satisfies a variety of needs, assures the ease of use, and permits smooth management. The present invention permits an operator at a low skill level to reliably perform a printing process in an error free manner.

The present invention permits an operator at a low skill level to perform a printing process with confidentiality of protected print image data.

The present invention permits an operator at a low skill level to provide sophisticated high-quality printing service free from print data leak, useless printing, and erratic operation.

The present invention allows for designating the type and model of an apparatus performing the printing process on a per order sheet basis in a manner such that a print having a high finished accuracy and consistency in color in color printing is provided.

According to an aspect of the present invention, a print processing apparatus, having a print step processing unit for performing at least one print step of producing a print, includes: a storage unit for storing print image data, print step information relating to a plurality of print steps for producing the print of the print image data, and a progress state of the print steps; a read unit for reading the print step information stored in the storage unit; an updating unit for updating the progress state of the print steps stored in the storage unit subsequent to the processing of the print step performed by the print step processing unit; and a display for displaying a next print step based on the print step information that is read from the storage unit by the read unit.

According to another aspect of the present invention, a print processing apparatus including a print step processor for performing at least one print step of producing a print comprises: a storage unit for storing data comprising print image data, print step information relating to a plurality of print steps for producing the print of the print image data, and a progress state of the print steps; a reader for reading the print step information stored in the storage unit; an update unit for updating the progress state of the print steps stored in the storage unit subsequent to the processing of the print step performed by the print step processor; and a controller for controlling operation of the print step processor based on the print step information read from the storage unit by the reader.

Further features and advantages of the present invention will become apparent from the following description of the preferred embodiments with reference to the attached drawings.

BRIEF DESCRIPTION OF THE DRAWINGS

FIG. 1 is a block diagram of an image forming system (on-demand printing system) incorporating an information processing apparatus, an image forming apparatus, and a post-processing apparatus in accordance with a first embodiment of the present invention.

FIG. 2 illustrates a workflow of printing process of the on-demand printing system in accordance with the first embodiment of the present invention.

FIG. 7 is a table listing process step IDs for identifying process steps in accordance with the first embodiment of the present invention.

FIGS. 14-15 are diagrams illustrating notes in error processes of FIG. 13.

FIG. 16 is a diagram illustrating an example of display in the process of FIG. 13.

DESCRIPTION OF THE EMBODIMENTS

First Embodiment

FIG. 1 is a block diagram of an image forming system (on-demand printing system) incorporating an information processing apparatus, an image forming apparatus, and a post-processing apparatus in accordance with a first embodiment of the present invention.

As shown, a personal computer (PC) 1 communicates with a color laser beam printer (color LBP) 2 and a scanner 3 via a network 10.

The PC 1 performs a preflight process before an image forming apparatus, such as a printer, outputs a printout. In the preflight process, the PC 1 displays a preview of data to be processed on the screen thereof to allow an operator of the PC 1 to check print image data as print data. The PC 1 performs a proofing process to allow the operator to verify printout results. In the proofing process, the PC 1 causes a printer to print out data to check to see if the print data is printed as intended by the operator. In the proofing process, the PC 1 performs a rasterize process on the print data that is subjected to pre-print process (including the preflight and original document editing process), and then causes the color LBP 2 to print out the data (printing process). The PC 1 also performs a page sequencing process which assigns the print data to each page taking into consideration the size of a sheet in use, the final printout size, and a method of book binding.

The PC 1 also reads an original document received as a paper document using the scanner 3 to obtain electronic data (the data of the original document scanned by the scanner 3 is converted into PDF data), and performs an editing process on the print data input and/or print data that is read by the scanner 3 from the original paper document input.

The PC 1 also instructs a predetermined user to deliver a finished document and to return a USB memory 201 (FIG. 3), and manages a delivery slip of a delivered product and shipment history.

An electrophotographic color copying apparatus (also referred to as a color image forming apparatus) 20 performs a printing process based on the print data.

The above-described functions of the PC 1 may be performed by a system of a plurality of information processing apparatuses or a single PC 1 alone.

Figure 3:
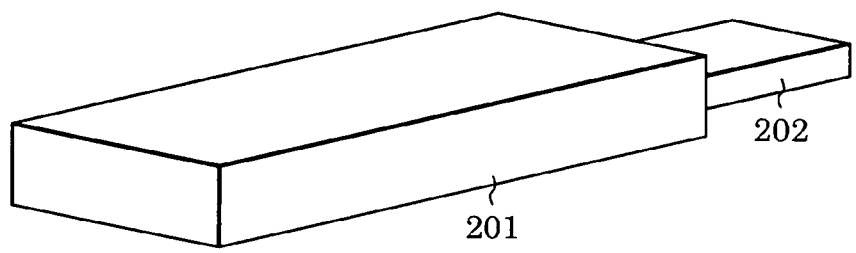
FIG. 3 is a perspective view of a USB memory for use with the image forming apparatus of the first embodiment of the present invention.

Each of the PC 1, the electrophotographic color copying apparatus 20, a cutter 21, a book binder 22, a folder 23, a packager 24, and a collator 25 has a USB interface and is connected to a USB memory 201, shown in FIG. 3, via the USB interface.

The cutter (also referred to as a trimmer device) 21 cuts set sheets. For example, the cutter 21 performs a cutting process on recording sheets printed by the image forming apparatus (printer) in the system, in response to a command input through various operation units (user interface units) by an operator. The book binder (also referred to as a finisher device) 22 performs a book binding process on set sheets. For example, the book binder 22 performs a stapling process or a book binding process on the recording sheets printed by the image forming apparatus in the system, in response to a command input through various operation units (user interface units) by the operator. The folder (also referred to as a saddle stitch device) 23 performs a folding process on set sheets. In response to a command input through various operation units (user interface units) by the operator, the folder 23 performs the folding process on the recording sheets printed by the image forming apparatus in the system. The packager 24 performs a packaging process on set sheets. In response to a command input through various operation units (user interface units) by the operator, the packager 24 packages, into a predetermined package, the recording sheets that have undergone a predetermined sheet process (such as one of the stapling process, book binding process, punching process, cutting process, and folding process) of the previously discussed sheet processing devices (the cutter 21, the book binder 22, and folder 23). The collator 25 performs a sorting process on set sheets. More specifically, the collator 25 performs a sorting process, a collating process, and a mixing process on the recording sheets printed by the image forming apparatus in the system in response to a command from the operator so that the pages are properly arranged. The color LBP 2 and the electrophotographic color copying apparatus 20 are collectively referred to as a printer apparatus or an image forming apparatus. The cutter 21, the book binder 22, the folder 23, the packager 24, and the collator 25 are collectively referred to as a sheet processing apparatus.

FIG. 1 illustrates the PC 1, the electrophotographic color copying apparatus 20, the cutter 21, the book binder 22, the folder 23, the packager 24, and the collator 25 as a print processing apparatus for performing at least one print process step for producing a print (as shown in FIG. 7 later). The present invention is applicable to print processing apparatuses other than the apparatus described above.

The print step discussed herein is not limited to a print step process in which the image forming apparatus performs a print process. For example, a pre-process step of the image forming apparatus in which the print data to be printed on the image forming apparatus is generated in the PC 1 (document input process) is also contained as one of the process steps. The sheet processing devices 21-25 perform, on the recording sheets printed by the image forming apparatus, post-process steps, such as a stapling step, a punching step, a binding step, a folding step, and a cutting step subsequent to the print process of the image forming apparatus. Such post-process steps also fall within the category of the print steps. A plurality of print steps including the print step performed by the image forming apparatus and other print steps are respectively referred to as a print step.

Figure 9:
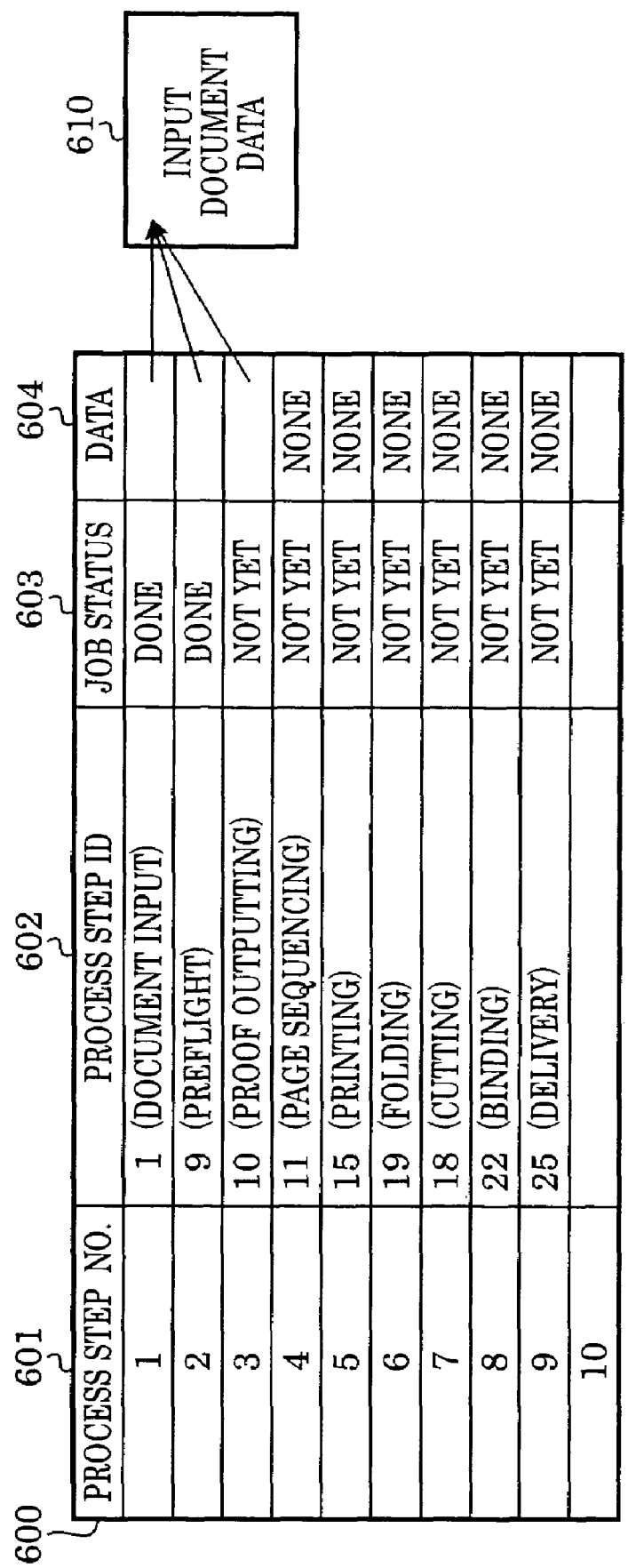
Figure 10:
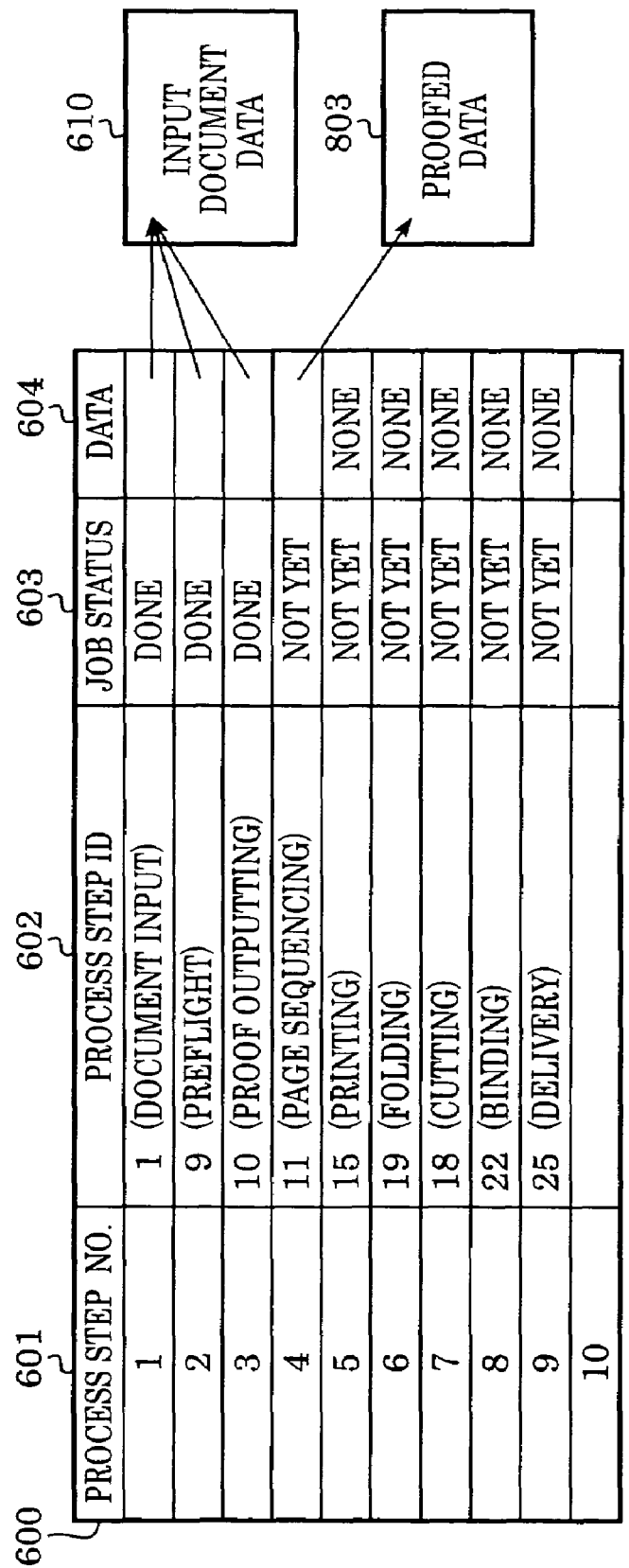
Figure 11:
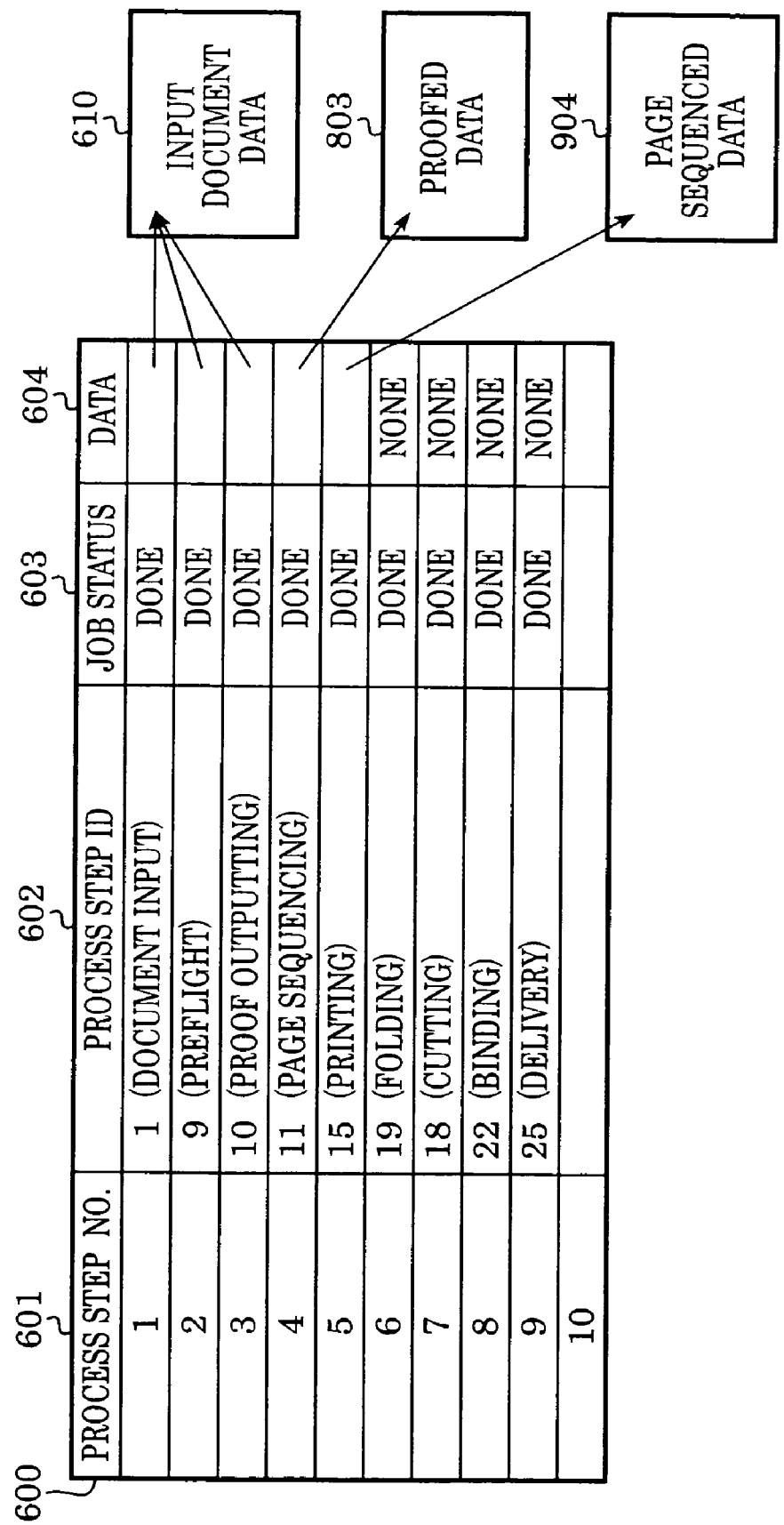

As will be discussed later, each of a document input step 100—a binding step 107 of FIG. 2 is one of the print steps. Each of a document input step through a delivery step of FIGS. 9-11 is also one of the print steps. A series of job steps containing a plurality of process steps is referred to as a workflow.

The system of the first embodiment of the present invention performs a plurality of process steps using at least two devices of the plurality of devices in the system (containing an information processing apparatus such as the PC 1, a plurality of printer apparatuses such as the color LBP 2 and the electrophotographic color copying apparatus 20, and a plurality of sheet processing apparatuses including the cutter 21, the book binder 22, the folder 23, the packager 24, and the collator 25), thereby outputting a single final finished product.

In the following example, the system of the present invention produces a final finished product in response to the request of a user (client) through a plurality of process steps of the plurality of devices thereof. For example, the PC 1 performs an editing process on job data to be printed. Edited data is displayed for preflight check on the monitor of the PC 1 subsequent to the editing process. Subsequent to the preflight check, the edited data is transmitted to the printer device 2 through a communication medium such as the network 10. The printer device 2 performs a printing process on the edited data. Printed recording sheets are then stapled by the book binder 22. The stapled recording sheets are then put into a package by the packager 24. A series of process steps is now fully completed. As discussed above, a plurality of process steps (job steps) that are performed by a plurality of devices to produce a final finished product in response to the request from a client is referred to as a workflow. An operator intervention may be required to transfer the sheets from one device to another in the workflow. For example, to staple the recording sheets, printed by the LBP 2, on the book binder 22 (for shifting from the print step to the stapling step), the operator manually conveys a bundle of recording sheets from the printer device 2 to the book binder 22, and sets the recording sheets on the book binder 22, and causes the book binder 22 to perform the stapling process. The workflow to perform a plurality of process steps with a plurality of devices may or may not require operator intervention. The system of the first embodiment of the present invention performs a variety of job steps with ease of use and under a user friendly environment.

The electrophotographic color copying apparatus 20 and post-processing apparatuses (such as the cutter 21, the book binder 22, the folder 23, the packager 24, and the collator 25) are separate devices in the foregoing discussion. Alternatively, at least one post-processing device may be optionally attached to the electrophotographic color copying apparatus 20, or the electrophotographic color copying apparatus 20 may be provided with a cutting function, a book binding function, a folding function, a packaging function, and a collate function. In this case, a USB interface and control means may be shared.

FIG. 2 illustrates a workflow of print process of the on-demand printing system in accordance with the first embodiment of the present invention.

In a document input step 100, print data in a PDF format is received from a print client. For example, a controller such as a CPU of the PC 1 controls a memory thereof to store the client data in the PDF format. In this example, the document input step 100 includes a process that the controller of the PC 1 causes the PC 1 to receive the print data.

In a preflight step 101, the operator checks, on a monitor of the PC 1, the data received from the client to the PC 1 in the document input step 100. In the preflight process, the operator of the system checks the print data on a preview screen of the PC 1 prior to print output to see if there is any problem in the print data. Viewing the preview screen, the operator checks fonts in use, spot color, a mode of an image, overprint, etc., of the print data. If the operator finds any problem, the operator notifies the client, who has ordered the print in the system, of the problem, and modifies the print data if necessary. The preflight step 101 includes a process of the controller of the PC 1 of causing the monitor of the PC 1 to display the preview screen, and a data modification process that the operator modifies the print data using a mouse and/or a keyboard after checking the print data preview on the monitor of the PC 1.

In a proof step 102, a proof sheet is printed for proofing. The PC 1 causes the color LBP 2 to print out the print data and the operator checks with the client about the color of the print data. The proof step 102 includes a process of the controller of the LBP 2 to cause the LBP 2 to perform a printing process of the print data transferred from the PC 1 via the network 10, and a process of the operator of verifying the color of the printout.

In a page sequencing step 103, the PC 1 assigns the print data to respective pages taking into consideration the size of sheets, the size of the final prints, and the method of book binding. The page sequencing step 103 includes a process of the controller of the PC 1 of causing a data processing unit of the PC 1 to perform a page sequencing layout process on the print data in response to a command from the operator.

In a printing step 104, the electrophotographic color copying apparatus 20 performs a printing process. Known print steps, such as plate making, press plate, offset printing, may also be used. The electrophotographic color copying apparatus 20 is a complex apparatus having a network function, a copying function, and a printing function that permits the print data received from the PC 1 to be printed. The page sequencing step 103 includes a process in which the print data that has been page sequenced by the PC 1 in the page sequencing step 103 is transferred to the electrophotographic color copying apparatus 20 via the network 10, and in response, the electrophotographic color copying apparatus 20 prints out the print data.

In a folding step 105, the folder 23 performs a folding process on the sheets printed by the electrophotographic color copying apparatus 20. If the folder 23 is not connected to the electrophotographic color copying apparatus 20, the operator manually conveys the recording sheets printed by the electrophotographic color copying apparatus 20 to the folder 23. The folding step 105 includes this operator intervention.

In a cutting step 106, the cutter 21 cuts the sheets folded by the folder 23 to a desired size.

In a binding step 107, the book binder 22 binds the sheets, cut by the cutter 21, in accordance with a predetermined binding method.

The PC 1 performs all of steps (the document input step 100 through the binding step 107) in the order described above, thereby outputting a final finished product ordered by the client.

The system of the first embodiment of the present invention performs the workflow of the plurality of print steps with the plurality of devices, including the operator intervention in order to produce the final finished product desired by the user (client).

In accordance with the first embodiment of the present invention, process management information is used to smoothly perform management, operation, and control of a plurality of process steps contained in the workflow to produce a single final finished product (to complete a single job). Any appropriate device in the system creates the process management information used in the workflow. For example, the PC 1 creates the process management information in response to print conditions input by the operator. The process management information created by an appropriate device is written onto a portable memory (also referred to as a removable medium), such as a USB memory. The removable medium is controlled to store not only the process management information but also the print data that is material data of the final finished product produced based on the process management information. It is perfectly acceptable that the removable medium stores one of or both of the process management information and the print data. In the system of the first embodiment of the present invention, each of the devices includes a read unit (a USB read unit 301 shown in FIG. 4 in the first embodiment) for performing a read process, a write process, and an update process on a variety of data (including the process management information and the print data) stored in the removable medium. The USB read unit 301 performs at least one of the read process, the write process, and the update process. The controller of one device reads the process management information from a USB memory loaded by the operator into the USB read unit 301 of a host device, and learns the process management information. The controller controls the host device and performs a reporting process to the operator based on the process management information. The controller then overwrites or modifies the process management information in the USB memory in response to the operational status of the host device. In the discussion of the embodiments of the present invention, the USB memory is used.

FIG. 3 is a perspective view of the USB memory 201 for use with the image forming apparatus of the present invention.

As shown, the USB memory 201 having a flash memory 202 (e.g., of about 128 MB) is used with a USB connector thereof received in a USB slot (USB interface). In accordance with the first embodiment of the present invention, the USB memory 201 is used as a portable storage unit detachably loaded into each of the devices of the system (including the PC 1, the color LBP 2, the scanner 3, the electrophotographic color copying apparatus 20, the cutter 21, the book binder 22, the folder 23, the packager 24, and the collator 25). The present invention is not limited to the USB memory 201. Any storage unit is acceptable as long as the storage unit stores the print data, and the process management information required for a plurality of devices to perform the steps in the workflow, update the data thereof, and allows each device to read the data thereof.

An ordinary personal computer, such as Windows® PC or Macintosh® PC, is allowed to access to the USB memory 201 as a drive, and using a dedicated utility software program, the computer sets a password to control access to a predetermined area of the USB memory 201.

Figure 4:
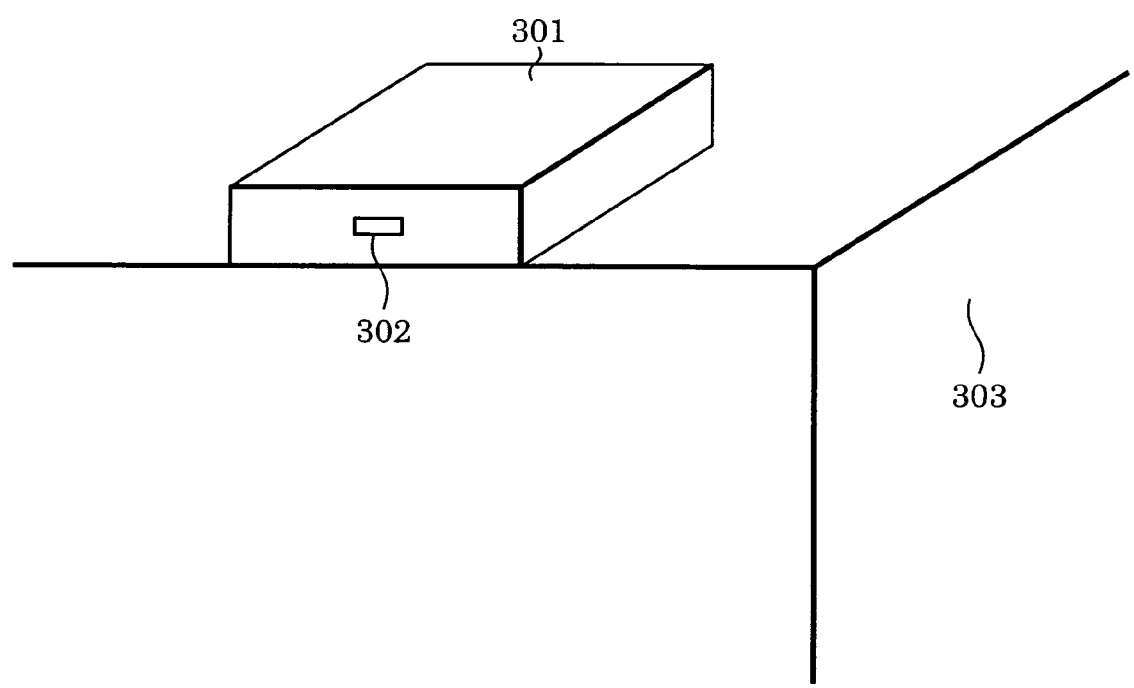
FIG. 4 is a perspective view of a USB memory read unit mounted in a high-speed electrophotographic color copying apparatus that performs a printing operation in accordance with the first embodiment of the present invention.

FIG. 4 is a perspective view of the USB memory 201 read unit mounted in the high-speed electrophotographic color copying apparatus 20 that performs a printing operation in accordance with the first embodiment of the present invention.

As shown, a surface 303 is the right-hand side of the electrophotographic color copying apparatus 20. The USB read unit 301 is mounted on the top right portion of an operation section of the electrophotographic color copying apparatus 20. The USB read unit 301 has a USB slot 302 that receives the USB memory 201 of FIG. 3.

In the system, the devices of FIG. 1 are individually installed. Although the devices are electrically connected to each other via a communication medium, such as the network 10 (with the devices mutually communicable to each other), the devices are not mechanically connected to each other. It is not a requirement that all devices are electrically connected to each other. If the book binder 22 is integrated with the electrophotographic color copying apparatus 20, the book binder 22 and the electrophotographic color copying apparatus 20 are mechanically connected. In the system configuration, some of the devices may be electrically and mechanically integrated as a single device. A variety of system configurations are contemplated. In exemplary embodiments, each device in the system has the USB read unit 301 thereof. More specifically, each of the PC 1, the cutter 21, the book binder 22, the folder 23, the packager 24, and the collator 25 has the USB read unit 301 thereof. For example, if two devices are electrically and mechanically integrated, one of the two devices is provided with the USB read unit 301.

Figure 5:
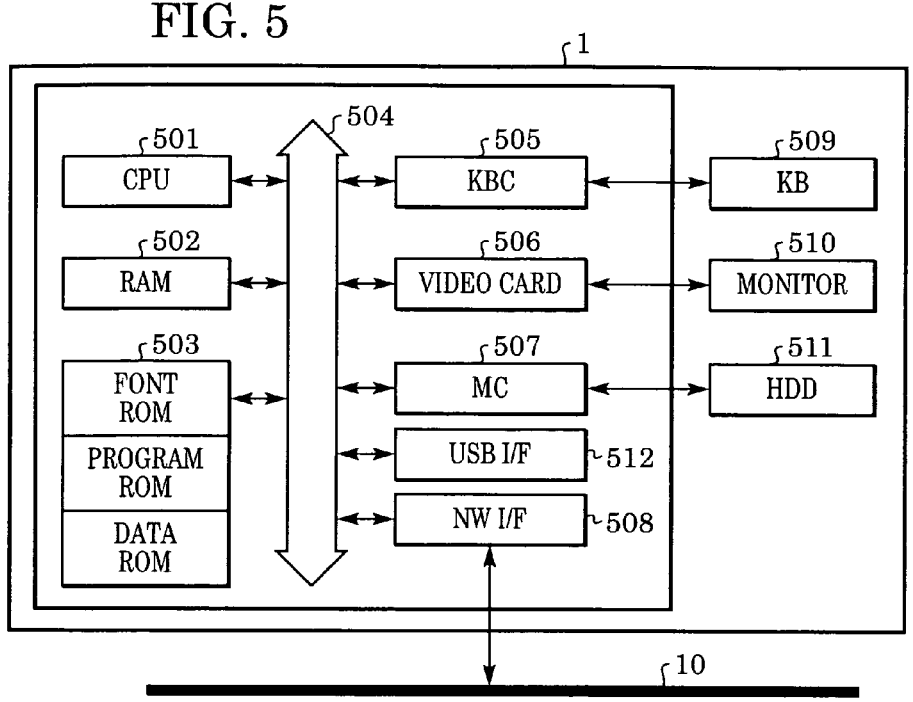
FIG. 5 is a block diagram illustrating the structure of a PC (personal computer) of FIG. 1.

FIG. 5 is a block diagram illustrating the structure of the PC 1 of FIG. 1.

As shown, a central processing unit (CPU) 501 controls each of the devices connected to a system bus 504 under the control of a program stored in a program ROM of the read-only memory (ROM) 503, and generally controls the PC 1.

A font ROM of the ROM 503 stores font data, etc., and a data ROM of the ROM 503 stores a variety of data. A random-access memory (RAM) 502 functions as a main memory of the CPU 501, and serves as a working area of the PC 1.

A keyboard controller (KBC) 505 controls inputs from a keyboard (KB) 509 and/or a pointing device (not shown), such as a mouse. A video card 506 controls display of a monitor 510.

A memory controller (MC) 507 controls access to a hard disk drive (HDD) 511 and/or other external storage device (compact disk ROM (CD-ROM), digital versatile disk (DVD), etc.). A network interface (NW I/F) 508 controls communication with the network 10.

A USB interface (USB I/F) 512 is identical to the USB read unit 301 of FIG. 4.

In response to a command from the operator, the PC 1 performs, under the control of the controller (CPU 501) thereof, a write process or an overwrite process (update process) on a variety of data (document data to be printed produced by the PC 1, the process management information, and information required for the process management information) in the USB memory loaded in the USB read unit 301 of the USB read unit 301 by the operator. Furthermore, in response to a command from the operator, the PC 1 performs, under the control of the CPU 501 thereof, a read process on a variety of data (document data to be printed produced by another information processing apparatus such as a client computer, the process management information, and information required for process management information) in the USB memory loaded in the USB read unit 301 by the operator. Based on the process management information read from the USB memory 201, the controller of the PC 1 determines whether to input the document, reads the print data from the USB memory 201 based on the process management information, and displays the read print data on the preview screen of the monitor of the PC 1.

Figure 6:
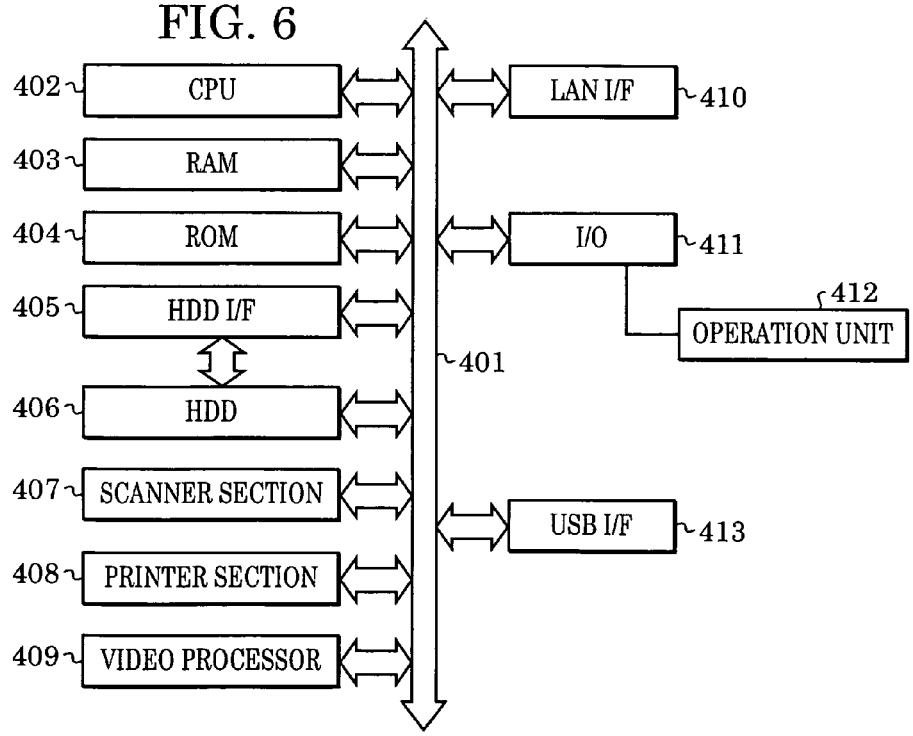
FIG. 6 is a block diagram of the electrical structure of the electrophotographic copying apparatus that performs a printing operation in accordance with the first embodiment of the present invention.

FIG. 6 is a block diagram of the electrical structure of the electrophotographic color copying apparatus 20 that performs a printing operation in accordance with the first embodiment of the present invention.

As shown, a CPU 402 connected to a system bus 401 executes a program stored in a ROM 404, a hard disk drive (HDD) 406, or any other storage device. A RAM 403 functions as a frame buffer storing scan image data, or print image data, or a working area for system operation.

ROM 404 stores a boot program at startup. Also included in the electrophotographic color copying apparatus 20 are a HDD I/F 405 as a hard disk interface and a HDD 406 storing system software and scan image data.

A scanner section 407 includes a charge-coupled device (CCD) sensor and a halogen lamp. A printer section 408 includes an electrophotographic color printer. A video processor 409 is an application-specific integrated circuit (ASIC) for gamma correction, calibration, color space conversion, etc.

A LAN interface (LAN I/F) 410 is connected to a LAN of 100 BASE-T/10 BASE-T of Ethernet. Also included are an input/output (I/O) controller 411 and an operation unit 412 including a display, such as a liquid crystal display (LCD), touch panel display and/or mechanical buttons.

A USB interface (USB I/F) 413 corresponds to the USB read unit 301 of FIG. 4.

In response to a command from the operator, the electrophotographic color copying apparatus 20 performs, under the control of the controller (CPU 402) thereof, a write process or an overwrite process (update process) on a variety of data (scan data to be printed produced by the electrophotographic color copying apparatus 20, the process management information, and information required for the process management information) in the USB memory loaded in the USB read unit 301 by the operator. Furthermore, in response to a command from the operator, the electrophotographic color copying apparatus 20 performs, under the control of the CPU 402 thereof, a read process on a variety of data (document data to be printed produced by another information processing apparatus such as a client computer, scan image data produced by the electrophotographic color copying apparatus 20, the process management information, and information relating to the process management information) in the USB memory loaded in the USB read unit 301 by the operator. In response to a command from the operator, the electrophotographic color copying apparatus 20 performs, under the control of the controller thereof, a print process on the print data stored in the USB memory set in the USB read unit. For example, when the electrophotographic color copying apparatus 20 performs a predetermined process, such as the print process, based on the process management information stored in the USB memory 201, the controller of the electrophotographic color copying apparatus 20 writes, onto the USB memory 201, progress data indicating that the process has been completed, thereby overwriting and/or updating the process management information in the USB memory 201.

The print operation is discussed next with reference to FIG. 6.

The CPU 402 receives, via a LAN I/F 410 or a USB I/F 413, a job (the print data transferred from the PC 1 via a network, and the print data read from the USB memory 201 set in the USB read unit 301 of the electrophotographic color copying apparatus 20) described in PostScripts® or PDF, and stores the job in a working area of the RAM 403. The CPU 402 interprets the PostScript® description, generating a raster image, and storing the raster image in a frame buffer of the RAM 403. The raster image is then developed onto a sheet on the printer section 408. The print process is repeated in the order of MCYK (magenta, cyan, yellow, black) to form a color image.

Each of the cutter 21, the book binder 22, the folder 23, the packager 24, and the collator 25, shown in FIG. 1, is identical in structure to the electrophotographic color copying apparatus 20 of FIG. 6. However, instead of the scanner section 407, the printer section 408, and the video processor 409 in the electrophotographic color copying apparatus 20, the cutter 21, the book binder 22, the folder 23, and the packager 24, and the collator 25 include a cutting section, a book binding section, a folding section, a packaging section, and a collating section, respectively.

If the electrophotographic color copying apparatus 20 features the cutting function, the book binding function, the folding function, the packaging function, and the collating function, the electrophotographic color copying apparatus 20 includes a cutting section, a book binding section, a folding section, a packaging section, and a collating section in addition to the structure shown in FIG. 6.

FIG. 7 is a table listing process step IDs for identifying the process steps in accordance with the first embodiment of the present invention.

As shown, process step IDs are uniquely assigned to all job items of the print process (a plurality of process steps contained in the workflow are assigned with respective process step IDs) for process management. FIG. 7 lists job items corresponding to process step IDs 1 through 25. The job items are not limited to those listed here, and a variety of job items may be included depending on applications and objectives. The operator or an appropriate device such as the PC 1 learns job items of the process steps required to produce a final finished product ordered by the client and assigns process step IDs to the respective job items.

The example of the process step IDs of FIG. 7 is described below. The job item having the process step ID 1 corresponds to the document input, and is executed when a client or an operator of an order receiver writes document input data onto the USB memory 201 on the PC using print order writing software. Process step IDs 2-5 are performed by the client or the operator of the order receiver on the PC (such as the PC 1 of FIG. 1), and correspond to a "document checking" step, a "job slip input" step, a "document briefing" step, and a "progress schedule chart making" step, respectively. Process step ID 6, corresponding to a "photograph trimming" step, is performed by the PC 1 or the scanner 3 of FIG. 1 in response to a command from the operator. Process step ID 7, corresponding to a "scanning" step, is performed by the scanner 3 of FIG. 1 in response to a command from the operator. Process step IDs 8-11, corresponding to job items "desktop publishing (DTP) editing" step, "preflight" step, "proof outputting" step, and a "page sequencing" step (page layout process, such as nup printing, in which data of a plurality of pages is printed in a single page), respectively, are performed by the PC 1 in response to a command from the operator. Process step IDs 12-17 correspond to a "RIP" step (a process for expanding PDL data into bit-map data to be printed onto a sheet), a "computer to plate (CTP) output" step, a "plate setting" step, a "printing" step, a "printout checking" step, and a "print finishing" step, respectively, and are performed by the color LBP 2 or the electrophotographic color copying apparatus 20 of FIG. 1. The process step ID 15 includes a step of the LBP 2 or the electrophotographic color copying apparatus 20 for performing the print process on the print data. Process step ID 18, corresponding to a "cutting" step, is performed by the cutter 21. The process step ID 18 includes a cutting process of the cutter 21 of cutting the recording sheets printed by the image forming apparatus. Process step ID 19, corresponding to a "folding" step, is performed by the folder 23 of FIG. 1, for example. The process step ID 19 includes a process of the folder 23 of folding the recording sheets printed by the image forming apparatus. Process step ID 20, corresponding to a "collating" step, is performed by the collator 25 of FIG. 1. The process step ID 20 includes a process of the collator 25 of collating (sorting) the recording sheets printed by the image forming apparatus. Process step IDs 21 and 22, corresponding to a "gathering" step and a "binding" step, respectively, and are performed by the book binder 22 of FIG. 1. The process step ID 22 includes a binding process (stapling process) of the book binder 22 of binding the sheets printed by the image forming apparatus. Process step ID 23, corresponding to a "three-side trimming" step, is performed by the cutter 21 of FIG. 1. The process step ID 23 includes, as a finishing process, a process of the cutter 21 of cutting three of the four sides of each sheet printed by the image forming apparatus. If the left side of the sheet is to be stapled, the top, bottom, and right sides of the four sides are cut. Process step IDs 24 and 25, corresponding to a "packaging" step and a "delivery" step, are performed by the packager 24. For example, the process step ID 24 includes a process of packaging the fully post-processed recording sheets in a predetermined package (such as wrapping paper used to deliver the final finished product to the client). The process step ID 25 includes a process of delivering the packaged final finished product (the print result fully post-processed as requested by the client) to the client.

The above steps are determined and carried out by the PC 1 and any other devices in response to the instructions from the client (as to what print conditions are applied to the print process, and post-process, and delivery date). In response to the instructions from the client, the order of sequence of the process steps is automatically determined by the PC 1 and/or any other appropriate device, and/or determined manually by the operator. Alternatively, the client himself may determine what process steps are performed in what order of sequence in the workflow. The system may perform the printing operation in the workflow as instructed by the client.

The order receiver (the operator in the system) produces a print output satisfying requirements desired by the client based on the instructions provided by the client. A series of process steps for the production of the print output is learned and verified based on the requirements. The series of process steps are then divided into a plurality of job items taking into consideration the devices and the functions of the devices included in the system managed by the operator. The content of the job item and where to perform the job item are bound to a process step ID, and are then written onto the USB memory 201.

FIGS. 8-11 illustrate the memory map of the USB memory 201 used in the first embodiment of the present invention.

Figure 8:
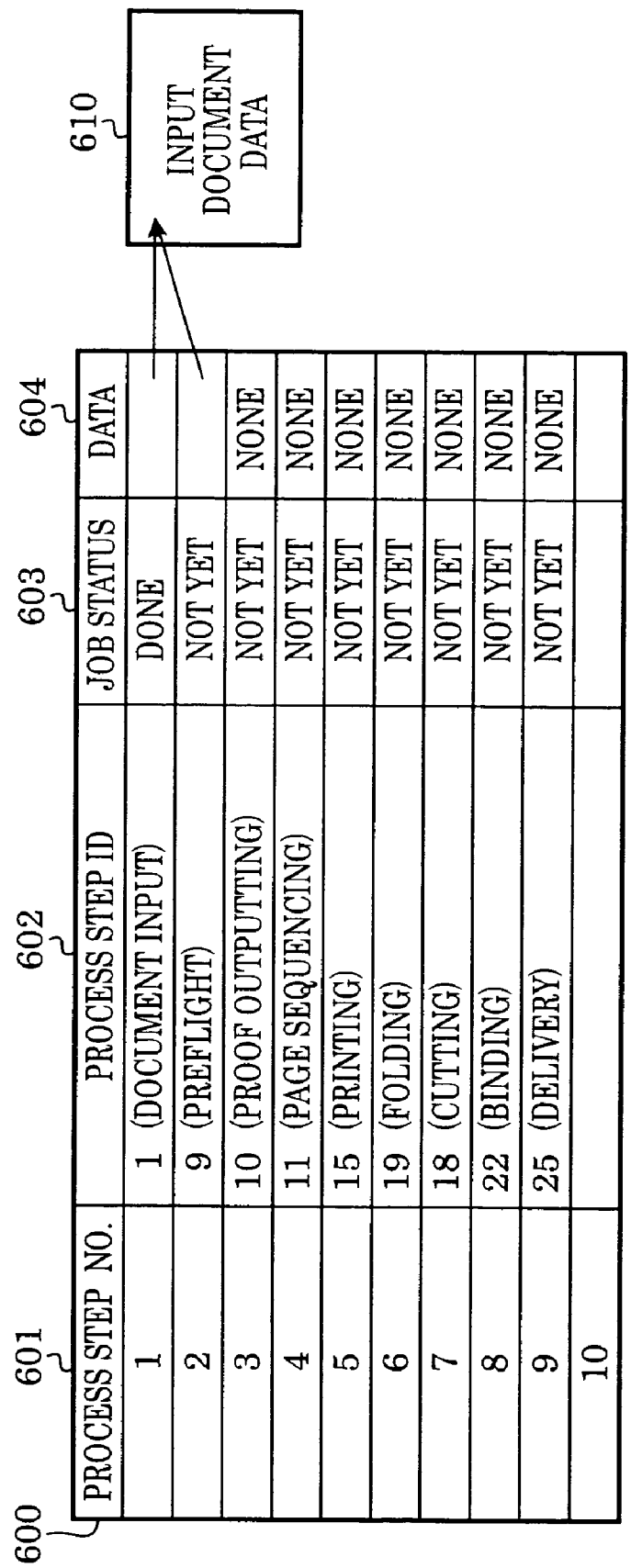
FIGS. 8-11 illustrate the memory map of a USB memory for use in the first embodiment of the present invention.

The USB memory 201 is distributed to the client together with the print order writing software. The client stores the input document data and the order content onto the USB memory 201 using the print order writing software. The content of the USB memory 201 is shown in FIG. 8.

As shown in FIGS. 8-11, a print process table 600 (also referred to as a print management table) is created in response to the client's requirements (editing and printing conditions including the number of prints, color, the size of recording sheets, layout, book binding conditions, etc.) and written onto the USB memory 201 using the print order writing software program.

The print process table 600, holding print step information, lists process step numbers 601, process step IDs 602, job status flags 603, and data pointers 604. The process steps 601 are a list of integers starting with "1", and indicate the order of a print job sequence.

FIGS. 8-11 list "1" to "10" as the process steps 601, but exemplary embodiments include sufficient reserved space to accommodate process steps "1" to "100."

Print process step job items described corresponding to the process step ID table of FIG. 7 are listed as the process step IDs 602, and are performed in the order as listed (according to the process step numbers 601).

A flag of "done" or "not yet" is listed as the job status flag 603. The job item has a "not yet" flag if the job is not yet completed, and has a "done" flag if the job is completed. The process step with the flag of "done" written on the job status flag 603 means that when the device executes the job item, the controller of the device writes on the USB memory 201 an indication that the process step of the job item has been completed. The process step with the flag of "not yet" written on the job status flag 603 means that the job item remains to be executed by the corresponding device, and the controller of the device writes on the USB memory 201 an indication that the process step of the job item is not yet completed.

Referring to FIGS. 8-11, the process management table as the workflow is created and stored on the USB memory 201 for the system to carry out the document input step, the preflight step, the proof outputting step, the page sequencing step, the printing step, the folding step, the cutting step, the binding step, and the delivery step in that scheduled order. FIG. 8 shows information stored in the USB memory 201, indicating that the first step (document input) of the plurality of process steps contained in the workflow is completed and that the second and subsequent steps (the preflight step through the delivery step) are not completed. FIG. 9 shows information stored in the USB memory 201, indicating that the steps down to the second step (the preflight step) are completed while the third and subsequent steps (the proof outputting step thereafter) are not yet completed. FIG. 10 shows information stored in the USB memory 201, indicating that the steps down to the third step are completed. FIG. 11 shows information stored in the USB memory 201, indicating that all process steps are completed.

The data pointer 604 points to print image data (input document data 610) which is referenced in the processing of the job item. If no particular print image data to reference is present, a value "none" is written.

Figure 12:
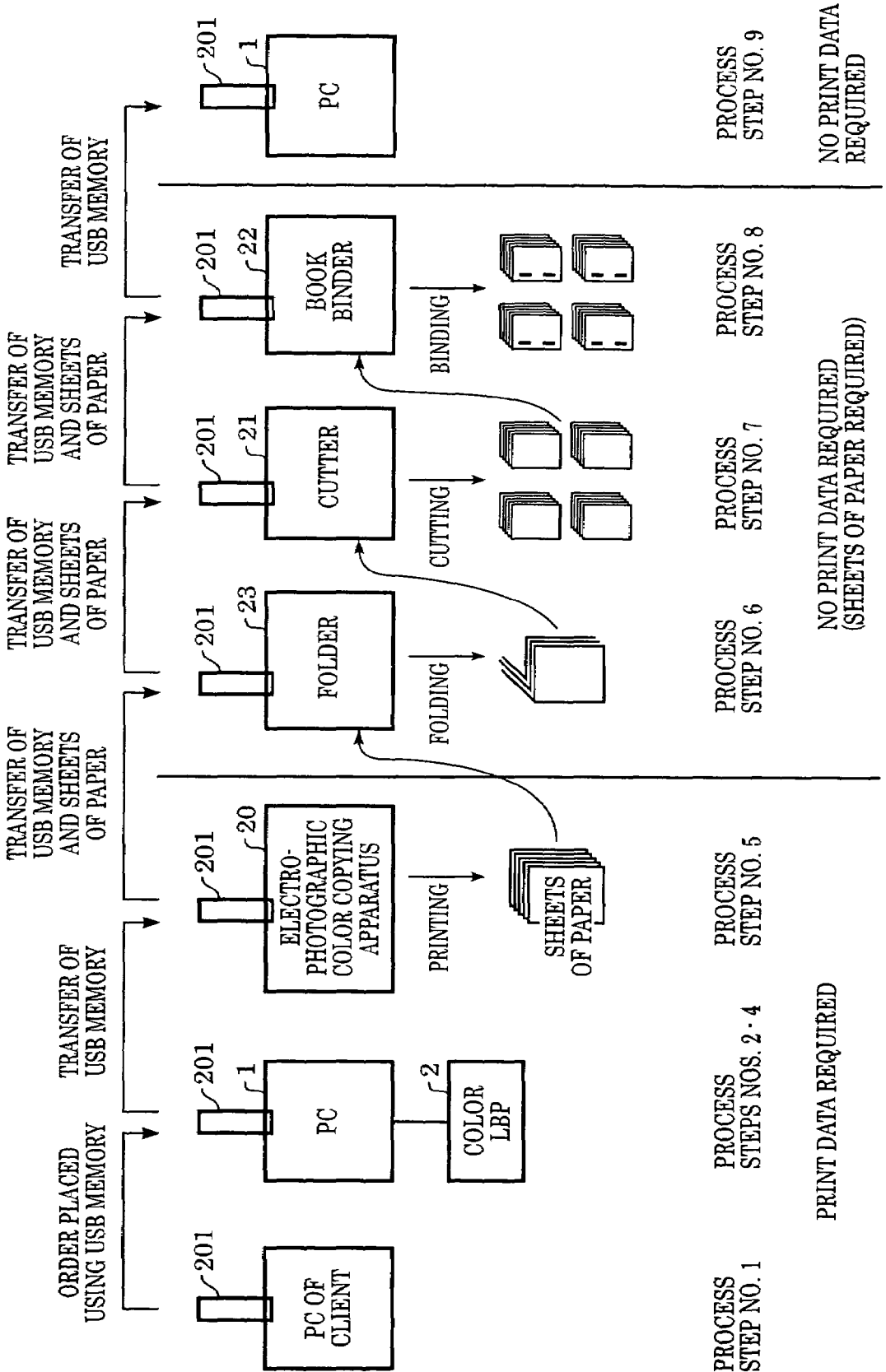
FIG. 12 is a diagram illustrating a job process of the process steps stored in the USB memory illustrated in FIGS. 8-11.

FIG. 8 shows the USB memory 201 in which the client writes the input document data 610 on the PC using the print order writing software program as will be shown in FIG. 12. FIG. 12 is a diagram illustrating a job process of the process steps stored in the USB memory 201 illustrated in FIGS. 8-11.

In accordance with the content of an order, the print order writing software program running on the PC of the client writes the print process table 600 and the input document data 610 on the USB memory 201 loaded in the PC of the client. The print order writing software sets the job status flag of the document input step of process step number 1 to "done", and sets the job status flags of the preflight step of process step number 2 and subsequent steps to "not yet". The reference data of the preflight step of process step number 2 is the input document data 610.

FIG. 9 illustrates the workflow with the preflight step of process step number 2 completed.

As shown in FIG. 12, the operator performs the preflight job with the USB memory 201 in the state of FIG. 8 set in the USB slot of the PC 1. Subsequent to the completion of the preflight step, the controller of the PC 1 controls the USB read unit 301 thereof and/or the USB memory 201 to perform a data update process to update the content of the USB memory 201 as shown in FIG. 9. A determination of whether any process step of interest is completed and an updating of the USB memory 201 are performed as described below. The controller of the PC 1 displays a UI screen having a button (not shown) thereon on the monitor of the PC 1 in succession of the completion of the process step, and urges the operator to select the button on the UI screen. When the operator selects the button, the controller of the PC 1 rewrites the information of the process step number 2 for the process step of interest from "not yet" to "done". The controller of the device having the USB memory 201 set therewithin controls the rewrite operation of the process data in response to the verification and completion of the process step input by the operator on the user interface of the device. For example, in the case of the later printing step, the LBP 2 or the electrophotographic color copying apparatus 20 as the printer device detects, in response to a detection signal from a discharge sensor for detecting whether a printed recording sheet is discharged into a discharge tray, that the printing process of desired print data has been completed. The controller of the printer device automatically rewrites the data for the job item from "not yet" to "done" in the USB memory 201 set in the USB read unit 301 of the printer device. In this way, the controller of the device automatically detects the end of the job item of interest in response to the information representing a process status from a unit, such as a sensor, mounted on the device, and then rewrites the data of the USB memory 201. In accordance with the first embodiment of the present invention, the devices of FIG. 1 for carrying out the respective process steps have the USB slots thereof receiving the USB memory 201 in a detachable manner. The controller of each host device rewrites the process data of each process step to be performed by host device in the USB memory 201 set in the USB slot.

In this example, no problem is found in the input data in the preflight job on the PC 1 (the input data is stored in the USB memory 201 storing the process management table), and thus no data modification is performed. The PC 1 displays the user interface screen on the monitor thereof to allow the operator to verify the data. On the user interface screen, the operator inputs information that the preflight step has been completed, and in particular that the input document has no problem and requires no modification.

In response, the controller of the PC 1 controls the USB memory 201 set in the USB read unit 301 thereof to rewrite the job status flag of step number 2 in the process management table in the USB memory 201 to "done", thereby updating the data of the process management table of the USB memory 201 from the data content of FIG. 8 to the data content of FIG. 9. The data of the process step number 3, namely, the proof outputting step, is now the input document data 610.

FIG. 10 shows that the process step number 3 for proofing has been completed. The controller updates the data of the process management data in the USB memory 201 to let each device and the operator recognize the progress state of the process step.

Referring to FIG. 12, the operator loads the USB memory 201 having the state of FIG. 9 into the USB slot of the PC 1. The PC 1 outputs a proof to the color LBP 2. When the PC 1 detects the end of the proof outputting, the controller (CPU 501) of the PC 1 controls the USB memory 201 set in the USB slot thereof to rewrite the data of the USB memory 201 to the one shown in FIG. 10.

Referring to FIG. 10, subsequent to the proof outputting, the controller (CPU 501) of the PC 1 causes the USB memory 201 to store, as proofed data 803 (serving as original print data), data color adjusted by the client. Furthermore, the controller (CPU 501) of the PC 1 changes the job status flag of process step number 3 in the process management table in the USB memory 201 to "done", and sets, as proofed data 803, data for use in the process step number 4 for page sequencing.

As shown in FIG. 12, the process step number 4 for page sequencing (such as a page layout job in nup printing) is performed with the USB memory 201 in the state of FIG. 10 loaded in the USB slot of the PC 1. The process step number 3 and the process step number 4 are consecutively performed by the PC 1. If a plurality of process steps are performed on the same device in this way, the USB memory 201 remains loaded in the USB slot of the PC 1 without the need for unloading and loading the USB memory 201. In the process step number 4, the controller controls the device to perform the page sequencing (screen editing) using the print data used in the process step number 3 (image data stored in the USB memory 201). In response to the end of the process step input in response to the operation on the UI of the PC 1, the controller of the PC 1 determines that the page sequencing step has been completed. The controller (CPU 501) of the PC 1 controls the USB memory 201 to rewrite the job status flag of the process step number 4 in the process management table on the USB memory 201 to "done". The controller (CPU 501) of the PC 1 controls the USB memory 201 to store the page sequenced image data as data for use in the next process step number 5. In this way, the controller of the PC 1 reads the unedited print data, edits the read print data, and stores the edited print data onto the USB memory 201 that has stored the unedited image data. In a later process step, the edited image data is thus available in another device having a USB slot. Both the unedited image data and the edited image data may be stored in the USB memory. Alternatively, once the edited image data is created, the unedited image data may be deleted from the USB memory 201, and the edited image data may be stored instead in the USB memory 201.

As shown in FIG. 12, in the process step number 5 for printing, the operator pulls the USB memory 201 having the state page sequenced in the process step number 4 out of the USB slot 301 of the PC 1 and inserts the USB memory 201 into the USB slot of the electrophotographic color copying apparatus 20. In this process step, the USB memory 201 stores information that all process step numbers 1 through 4 have been completed (with all flags of the process step numbers 1-4 set to "done"). The USB memory 201 also stores the edited image data that is page sequenced by the PC 1 in the process step number 4. The electrophotographic color copying apparatus 20 performs the process step number 5 for printing using the print data page sequenced by the PC 1 stored in the USB memory 201 loaded in the USB slot thereof. This process is controlled by the controller (CPU 402) of the copying apparatus 20. For example, the operator loads the USB memory 201 in the USB slot of the copying apparatus 20, and issues a print start command. The operation unit 412 of the copying apparatus 20 receives the print start command from the operator. In response, the electrophotographic color copying apparatus 20 reads the image data processed in the process step number 4 from the USB memory 201, and controls the printer section 408 thereof to print the image data read from the USB memory 201. A sensor (not shown) of the electrophotographic color copying apparatus 20 detects that the printing operation is completed. The sensor is a discharge sensor mounted in the vicinity of a discharge port through which the recording sheet bearing an image formed thereon is discharged into a discharge tray. In response, the controller (CPU 402) of the electrophotographic color copying apparatus 20 controls the USB memory 201 set in the USB slot thereof to rewrite the job status flag of the process step number 5 in the process management table in the USB memory 201 to "done". Alternatively, the controller of the electrophotographic color copying apparatus 20 detects the end of the printing operation as described below. An operation unit 412 of the electrophotographic color copying apparatus 20 displays an operation screen that urges the operator to input a command to end the printing operation. When the operator inputs the print end command on the screen, the controller (CPU 402) updates the process information of the USB memory 201. Since the next process step number 6 for a folding operation requires no print data, the print data is not stored in the USB memory 201. When one device hands the USB memory 201 over to a next device, the next device may not need electronic document data (the image data to be printed on the recording sheet). For example, when the printing operation is completed, data required in subsequent process steps is the recording sheet bearing the print data printed thereon, namely, paper data, rather than the electronic data. In the process steps subsequent to the printing step, the system does not use the electronic data but uses paper data. Therefore, the subsequent process steps do not need the print data. A storage process of the USB memory 201 is mainly performed to update job process data (process management data). In other words, the updating of the print data is not necessary.

Referring to FIG. 12, the operator pulls, out of the USB slot of the electrophotographic color copying apparatus 20, the USB memory 201 with the process step number 5 completed (with all job status flags of the process step numbers 1 through 5 set to "done") and inserts the USB memory 201 into the USB slot of the folder 23 for the process step number 6 for the folding step. The operator sets a bundle of the recording sheets, printed in the printing step of process step number 5, in a fold tray (not shown) of the folder 23. The operator selects a folding process button (not shown) of the folder 23 (the folding process button arranged on an operation section of the folder 23). Upon detection of the selection of the button, a controller (not shown) of the folder 23 performs the folding process. The operator inputs an end command of the folding process on the operation section of the folder 23. Alternatively, the controller of the folder 23 detects the end of the folding process in response to detection information from a sensor (not shown) mounted on a tray in which the recording sheets folded by the folder 23 are stacked. The controller of the folder 23 controls the USB memory 201 set in the USB slot to update the job status flag for the process step number 6 in the process management information to "done". Since the subsequent step, namely, the cutting step of process step number 7 requires no print data (electronic data), the controller of the folder 23 is free from the storage process of the print data to the USB memory 201 as in the preceding process step by the electrophotographic color copying apparatus 20. Only the updating of the process step data is performed.

Referring to FIG. 12, the operator pulls, out of the USB slot of the folder 23, the USB memory 201 with the folding step of process step number 6 completed (with all job status flags of the process step numbers 1 through 6 set to "done") and sets the USB memory 201 in the USB slot of the cutter 21 for the cutting step of process step number 7. The operator sets a bundle of the printed recording sheets, folded in the folding step of process step number 6, in an operation tray (not shown) of the cutter 21. The operator selects a cutting process button (not shown) of the cutter 21 (the cutting process button arranged on an operation section (not shown) of the cutter 21). Upon detection of the selection of the button, a controller (not shown) of the cutter 21 performs the cutting process. The operator inputs an end command of the cutting process on the operation section of the cutter 21. Alternatively, the controller of the cutter 21 detects the end of the cutting process in response to detection information from a sensor (not shown) mounted on a tray in which the recording sheets cut by the cutter 21 are stacked. The controller of the cutter 21 controls the USB memory 201 set in the USB slot to update the job status flag for the process step number 7 in the process management information to "done". Since the subsequent step, namely, the binding step of process step number 8 requires no print data, the controller of the cutter 21 is free from the storage process of the print data to the USB memory 201 as in the preceding process steps by the electrophotographic color copying apparatus 20 and the folder 23. The host device updates the process data of the process step ID of the host device only (namely, rewrites the job status flag of the process step of the host device from "not yet" to "done").

Referring to FIG. 12, the operator pulls, out of the USB slot of the cutter 21, the USB memory 201 with the cutting step of process step number 7 completed (with all job status flags of the process step numbers 1 through 7 set to "done") and sets the USB memory 201 in the USB slot of the book binder 22 for the book binding step of process step number 8. The operator sets a bundle of the printed recording sheets, cut in the cutting step of process step number 7, in an operation tray (not shown) of the book binder 22. The operator selects a binding process button (not shown) of the book binder 22. Upon detection of the selection of the button, a controller (not shown) of the book binder 22 performs the binding process. When the binding process is completed, the controller of the book binder 22 controls the USB memory 201 set in the USB slot to update the job status flag for the process step number 8 in the process management information to "done". Since the subsequent step, namely, the delivery step of process step number 9 requires no print data, the controller of the book binder 22 is free from the storage process of the print data to the USB memory 201 as in the preceding process steps by the electrophotographic color copying apparatus 20, the folder 23, and the cutter 21. The host device updates the process data of the process step ID for the host device only.

Referring to FIG. 12, the operator pulls, out of the USB slot of the book binder 22, the USB memory 201 with the binding step of process step number 8 completed (with all job status flags of the process step numbers 1 through 8 set to "done") and sets the USB memory 201 in the USB slot of the PC 1 for the delivery step of process step number 9. The operator selects a delivery button displayed on an operation screen (not shown) of the PC 1. The controller of the PC 1 controls the delivery step of process step number 9. The delivery step is thus performed. Upon detection of the selection of a delivery complete button, the controller (CPU 501) of the PC 1 updates the job status flag of the process step number 9 of the process management information in the USB memory 201 set in the system to "done". At this point of time, the process management table stored in the USB memory 201 becomes the one shown in FIG. 11. The controller of PC 1 references the process management information in the USB memory 201 shown in FIG. 11, where a next process step number 10 is unregistered. The controller of the PC 1 thus determines from the process management information stored in the USB memory 201 that no further process step is required with all job items scheduled in the workflow completed.

FIG. 11 illustrates the process management information with all printing steps completed.

All job status flags down to the delivery step of process step number 9 are set to "done", and the data pointer 604 holds page sequenced data 904. More specifically, the USB memory 201 stores, at least, the edited image data produced in the page sequencing step of process step number 5 by the PC 1.

In the process steps subsequent to the printing step of process step number 5, the data is not updated and the data pointer 604 remains "none". With information "none" written in the management table of the USB memory 201, each device and the operator recognize that the updating of the electronic data is not required in the corresponding steps.

In accordance with the first embodiment of the present invention, any of the devices in the system, the operator of the system, or the client himself schedules the workflow in response to the request from the client. The process management information defines, in the workflow, the process steps that are required and the order of sequence. The process management information as the process management table is written onto the USB memory 201 so that any device having the USB slot thereof in the system recognizes the process management information. The controller of each device in the system controls the USB memory 201 to write process step progress information that is recognized by the device having the USB slot in the system. The process step progress information is provided in the expression "not yet" or "done" to indicate whether or not each of the plurality of process steps to be managed in the process management table is completed. In each of the plurality of process steps to be managed in the process management table, the image data itself (including the unedited image data and/or the edited image data) to be printed is also stored in the USB memory 201. An easy-to-use, smoothly operated, flexible system free from the conventional drawback is provided by performing, on the devices in the present system, control process and user interface control discussed below.

The arrangements discussed below may be incorporated. For example, the print data, such as the input document data 610 and the proofed data 803, is stored together with the process management information and the progress information in the USB memory 201. The security of the stored data is heightened by controlling access to the stored data using a password set in the USB memory 201.

A device of a type that merely prints out data may be authorized access to the data within the device's own discretionary power so that complex operations are avoided while the data are still protected from leakage and alteration.

Access to the USB memory 201 may be authorized as described below. In response to the loading of the USB memory 201 to the USB slot of a device, the device requests the operator to input authentication data such as a password (or an IC card) on the operation section thereof. The device then compares the authentication data input by the operator with authentication data set beforehand in the USB memory 201 loaded therewithin. If the two pieces of authentication data match each other, the host device performs the process step while authorizing access to the USB memory 201 set in the host device. If the two pieces of authentication data fail to match each other, the controller inhibits the host device from performing the process step while blocking access to the USB memory 201 set in the host device. Each device performs such an operation each time the operator sets the USB memory 201 into the USB slot of the host device. With this arrangement, an operator at a low skill level is provided with sophisticated high-quality printing service with the high degree of confidentiality maintained.

Figure 13:
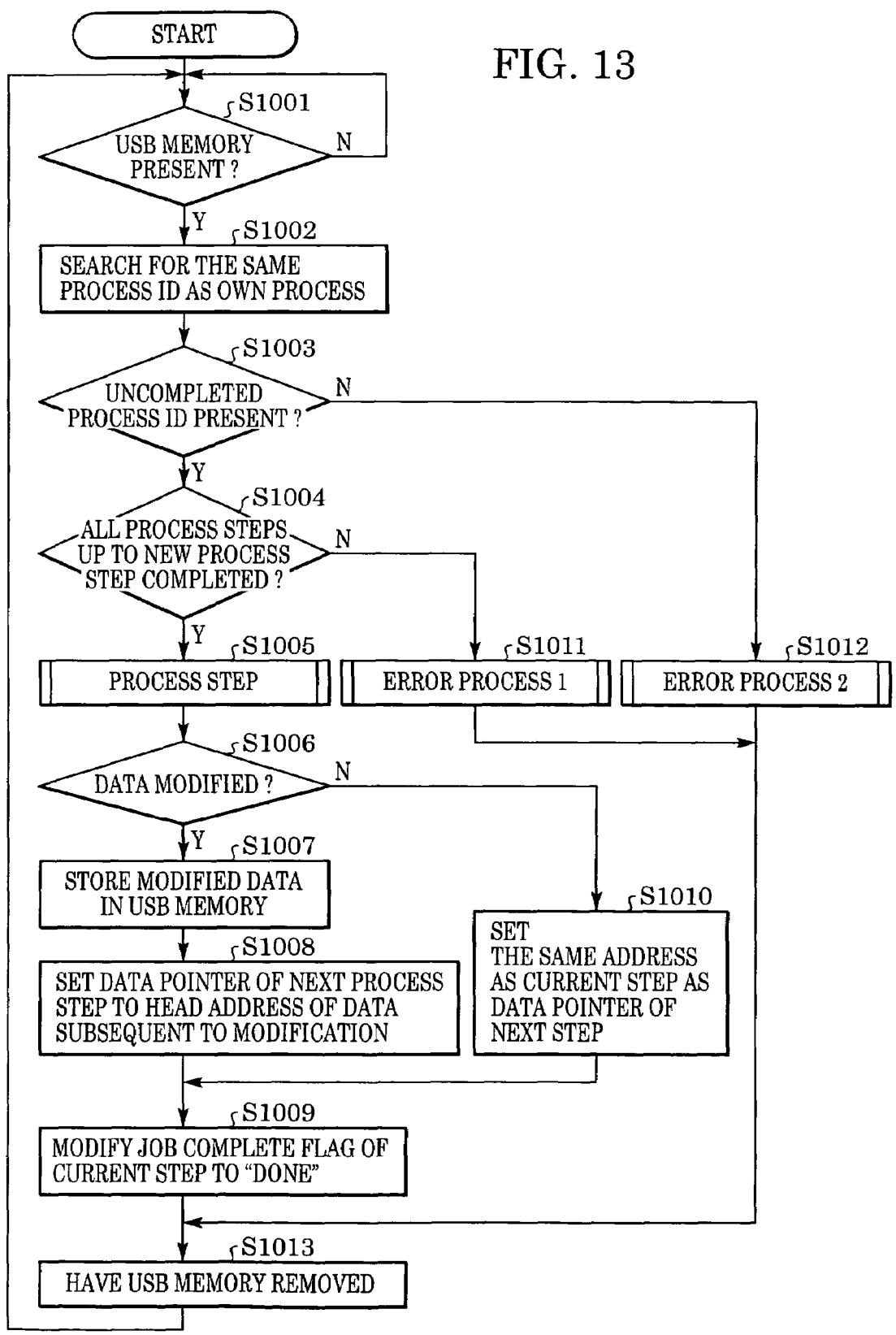
FIG. 13 is a flowchart illustrating a first control process of the printing system of the first embodiment of the present invention.

FIG. 13 is a flowchart illustrating a first control process of the printing system of the first embodiment of the present invention. The first control process shown corresponds to the operation based on the process information (process management information) stored in the USB memory 201 and performed by the PC 1, the electrophotographic color copying apparatus 20, the cutter 21, the book binder 22, the folder 23, the packager 24 and the collator 25. The steps in the flowchart of FIG. 13 are performed by the controllers of the PC 1, the electrophotographic color copying apparatus 20, the cutter 21, the book binder 22, the folder 23, the packager 24 and the collator 25, shown in FIG. 1, in accordance with the programs stored in the respective HDDs or any other storage media. The processes performed for the job items listed in FIG. 8 are basically identical to each other. S1001 through S1013 represent steps in the flowchart of FIG. 13.

The controller of a host device determines in step S1001 whether the USB memory 201 is loaded in the USB slot of the host device. If it is determined that no USB memory 201 is loaded, the controller waits on standby until the USB memory 201 is loaded.

If it is determined in step S1001 that the USB memory 201 is loaded in the USB slot of the host device, the controller references the information stored in the USB memory 201 in step S1002 to determine whether the USB memory 201 stores a process step in the print process table 600 thereof matching the process step assigned to host device. In the case of the electrophotographic color copying apparatus 20, for example, the controller of the electrophotographic color copying apparatus 20 references the content of the USB memory 201 therewithin to determine whether the process step ID for the printing process (the printing step of process step number 5 in the case of FIGS. 8-11) is contained in the process management table of the USB memory 201. In the case of the book binder 22, for example, the controller of the book binder 22 references the content of the USB memory 201 therewithin to determine whether the process step ID for the binding process (the binding step of process step number 8 in the case of FIGS. 8-11) is written in the process management table of the USB memory 201. Each device corresponding to the respective job item and the process software thereof holds the process step ID corresponding to the job item in accordance with the process ID correspondence table of FIG. 8. For the device, the ROM or hard disk holds the process step ID. For the software, the program code thereof holds the process step ID.

If the controller of the device determines in step S1003 that the USB memory 201 set in the host device does not store a process step in the print process table 600 thereof matching the process step (such as the preflight step or the page sequencing step in the case of the PC 1 or the RIP step or the printing step in the case of the copying apparatus) assigned to host device, an "error process 2" is performed in step S1012.

In the "error process 2" (step S1012), the controller of the device having the USB slot with the USB memory 201 loaded therein causes the display of the device to display a message, for example, reading "The device is not enabled to perform this job". For example, the display may be the operation unit 412 of the electrophotographic color copying apparatus 20 if the electrophotographic color copying apparatus 20 currently performs a process step verification process with the USB memory 201 set in the USB slot thereof. The display may be the monitor 510 of the PC 1 if the PC 1 performs the process step verification process with the USB memory 201 set in the USB slot thereof. Furthermore, in the "error process 2" (step S1012), the controller of the device may check the printing step table in the USB memory 201 in the order of the process step IDs to find the process step having the job status flag of "not yet", and presents, through the user interface to the operator, a message reading, for example, "next is a folding step" to inform the operator of the next job item. FIG. 14 illustrates a display example for the "error process 2" and is described below.

The example shown in FIG. 14 is the display of the packager 24, and presents the error display on the display thereof. The operator sets the USB memory 201 in the USB slot of the packager 24, and the controller of the packager 24 checks the process management table stored in the USB memory 201, and determines that the process to be performed by the packager 24 is not found in the workflow that is based on the process management information stored in the USB memory 201 (no in step S1003 of FIG. 13). The controller of the packager 24 notifies the operator so in the form of an error notice (step S1012 of FIG. 13). To cause the operator to recognize the error notice, the display on the screen of FIG. 14 is thus presented on the operation section of the packager 24. Furthermore, the controller of the packager 24 checks the information of "done" or "not yet" written in the job status flag in the process management table when the controller of the packager 24 references the process management table in the USB memory 201. The controller of the packager 24 thus determines what process steps are completed and what process steps are uncompleted. By checking the process management information of the USB memory 201 set in the USB slot of the packager 24, the controller of the packager 24 determines that the workflow (the series of process steps to be performed by the plurality of devices) contains at least the folding step of the folder 23. By checking the job status flag of the process management table of the USB memory 201, the controller of the packager 24 determines that the job status flags of process steps, prior to the folding step by the folder 23, from among a plurality of process steps contained in the workflow managed by the USB memory 201 are all updated from "not yet" to "done". Thus, the controller of the packager 24 determines that all process steps prior to the folding step by the folder 23 have been completed. The controller of the packager 24 determines that the process step with the job status flag thereof being "not yet" is present in the process management table of the USB memory 201, and that the folding step of the folder 23 is the process step scheduled to perform immediately subsequent to the process step with the job status flag thereof being "done". Based on the process management information of the USB memory 201, the folding step from among the plurality of process steps in the workflow is determined as an uncompleted process step and is to be performed next. The controller of the packager 24 controls the operation section of the packager 24 to report to the operator the information to be recognized as shown in the operation screen of FIG. 14.

A reporting process is performed through the user interface, such as the operation section, to prevent the operator from using an inappropriate device in the workflow, from among the plurality of devices, based on at least the process management information and the progress information, both of which are stored in the USB memory 201 that also stores the image data to be printed. The process management information includes process management scheduling data that allows each of the devices receiving the USB memory 201 to determine what device is used to perform what process step to produce a final finished product. The progress information indicates the progress of each of the plurality of process steps in the workflow, and allows each of the devices receiving the USB memory 201 to determine the completed process steps and the uncompleted process steps and/or what process step the system has advanced to. The progress information here is "not yet" and "done". For example, the operator may attempt to start the packager 24 with the USB memory 201 in the USB slot of the packager 24 even when a packaging step is not required in the workflow. As shown in FIG. 14, the controller of the packager 24 displays a message that the packager 24 does not perform the packaging step. If the operator commands a device to perform a process step although the process step of the device is to be performed at a later stage (another process step of another device is to be performed at this point of time), the controller of the device performs a reporting process on the user interface unit of the operation section to let the operator know the situation, based on the process management information and the progress information. Even if the operator performs an erratic operation, the system is prevented from responding to it. For example, if a next process step in the workflow to be performed is the folding process of the folder 23, the controller of the packager 24 notifies the operator that the next process step is the folding process. Each of the devices accessible to the removable media storing the image data of the system controls the user interface thereof to perform the reporting process to the operator based on the process management information and the process information.

A workflow typically contains a series of process steps to be performed by a plurality of devices to produce a final finished product in response to a request from the client. In the reporting control process, only devices related to the workflow are permitted to perform the respective process steps. The operator is inhibited from operating devices unrelated to the workflow, and the unrelated devices are thus prevented from operating in the workflow.

If the controller of a host device detects the selection of an "OK" button in response to the error message displayed on the operation screen thereof (e.g., the display shown in FIG. 14 (step S1012)), processing proceeds from step S1012 to step S1013.

If it is determined in step S1003 that the print process table 600 in the USB memory 201 holds a process step matching the process step ID of the process step of the host device, processing proceeds to step S1004.

The controller of the host device checks the job status flag 603 of a process step ID 601 prior to (less than) the process step ID of the host device to check that the job status flags 603 of the process steps IDs prior to the process ID of the host device are all "done". If it is determined in step S1004 that not all job status flags 603 of the prior process steps are "done", processing proceeds to step S1011 to display an "error process 1". In the "error process 1", if the operator commands a device to perform a process step although the process step of the device is to be performed at a later stage (another process step of another device is to be performed at this point of time), the controller of the device performs a reporting process on the user interface unit of the operation section inform the operator of the situation, based on the process management information and the progress information. Even if the operator performs an erratic operation, the system is prevented from responding to it. The controller of the host device having the USB slot with the USB memory 201 loaded therewithin causes the display thereof to display a message reading, for example, "Another process step must be performed prior to this job". The display here is the display of the operation unit 412 of electrophotographic color copying apparatus 20 if the electrophotographic color copying apparatus 20 performs the process step thereof with the USB memory 201 set in the USB slot thereof, or the monitor 510 of the PC 1 if the PC 1 performs a step verification process with the USB memory 201 set in the USB slot.

In the "error process 1", the controller of the host device having the USB slot with the USB memory 201 set therewithin checks the printing process table in the order of the process step IDs, and notifies the operator of a next job item in response to a process step having a "not yet" job status flag by displaying, for example, a message reading "the folding step must be performed first" through the user interface of the host device.

FIG. 15 illustrates an exemplary error display of the cutter 21. The controller of the cutter 21 checks the process management table stored in the USB memory 201. Although the cutter 21 performs the cutting step, the controller of the cutter 21 determines that folder 23 must perform first the folding step as a prior process step, based on the process management information and the progress information (with the job status flag of the folding step set to "not yet"). The controller of the cutter 21 thus alerts the operator of the cutter 21 to the situation, while presenting a display screen on the operation section of the cutter 21.

When the controller of the host device detects the selection of an "OK" button selected on the operation screen of the host device in response to the error display such as the one shown in FIG. 15, processing proceeds from step S1011 to step S1013.

If it is determined in step S1004 that all job status flags 603 of the prior process steps are "done" (all prior process steps have been completed), processing proceeds from step S1004 to step S1005.

In step S1005, the process of each process step is performed. If the process step ID is "9", namely, the preflight job by the PC 1 (the second process step in this workflow) as shown in FIGS. 8-11, the PC 1 performs the preflight step on the print data in the USB memory 201 on condition that the controller of the PC 1 verifies that the process steps (the document input step only) prior to the process step of process step ID 9 in the USB memory 201 set in the USB slot of the PC 1 are completed (with all job status flags of the prior process steps set to "done"). For example, the controller of the PC 1 permits the operator to check the electronic data received from the client, and the PC 1 performs the preflight process.

If the process step ID is "10", namely, the proof outputting (the third process step in the workflow), the controller of the PC 1 permits the color LBP 2 to pint out the print data in the USB memory 201 to perform the proof outputting on condition that the controller of the LBP 2 verifies that the process steps (the document input step and the preflight step) prior to the process step of ID 10 in the process management information of the USB memory 201 have been completed (with all job status flags of the process steps prior to the process step ID 10 set to "done"). The proof outputting is thus performed by the LBP 2. The print data, read from the USB memory 201 set in the USB slot of the PC 1, is transmitted to the LBP 2 via a network, and the print data is printed out on the LBP 2. Alternatively, the operator sets the USB memory 201, which is pulled out of the USB slot of the PC 1, in the USB slot of the LBP 2. The controller of the LBP 2 controls the LBP 2 to print out the print data in the USB memory 201 set in the USB slot. Either method is acceptable. Once the LBP 2 prints out the print data, the operator checks the color of the printout.

If the process step ID is "11", namely, the page sequencing step of the PC 1 (the fourth process step in the workflow), the controller of the PC 1 permits the PC 1 to perform a variety of layout processes in response to a command from the operator on condition that the controller of the PC 1 verifies that the process steps (the document input step, the preflight step, and the proof outputting step) prior to the process step of ID 11 in the process management information of the USB memory 201 have been completed (with all job status flags of the process steps prior to the process step ID 11 set to "done"). In the layout process, the page sequencing is performed based on the size of the sheets, the size of final printout, and the binding method. The page sequencing process is thus performed by the PC 1.

If the process step ID is "15", namely, the printing step of the PC 1 (the fifth process step in the workflow), the controller of the electrophotographic color copying apparatus 20 permits the electrophotographic color copying apparatus 20 to print the print data in the USB memory 201 on condition that the controller of the electrophotographic color copying apparatus 20 verifies that the process steps (the document input step, the preflight step, the proof outputting step, and the page sequencing step) prior to the process step of ID 15 in the process management information of the USB memory 201 have been completed (with all job status flags of the process steps prior to the process step ID 15 set to "done"). The printing step is thus performed by the electrophotographic color copying apparatus 20. In the preceding fourth process step, the print data edited by the PC 1 is transmitted to the electrophotographic color copying apparatus 20 via the network, and the electrophotographic color copying apparatus 20 prints out the edited print data under print specifications requested by the client (such as the number of prints, and single side printing or both side printing). Alternatively, the controller of the PC 1 causes the USB memory 201 set in the USB slot thereof to store the edited print data produced in the fourth process step. The operator then pulls the USB memory 201 out of the USB slot of the PC 1, and places the pulled USB memory 201 into the USB slot of the electrophotographic color copying apparatus 20. The controller of the electrophotographic color copying apparatus 20 reads the edited print data produced in the fourth process step from the USB memory 201 set in the USB slot thereof, and causes the electrophotographic color copying apparatus 20 to print out the edited print data under the print specifications requested by the client (such as the number of prints, and single side printing and both side printing). Either method is acceptable.

If the process step ID is "19", namely, the folding step of the folder 23 (the sixth process step in the workflow), the controller of the folder 23 permits the folder 23 to fold the sheets set by the operator (namely a bundle of recording sheets printed by the electrophotographic color copying apparatus 20) on condition that the controller of the folder 23 verifies that the process steps (the document input step, the preflight step, the proof outputting step, the page sequencing step, and the printing step) prior to the process step of ID 19 in the process management information of the USB memory 201 have been completed (with all job status flags of the process steps prior to the process step ID 19 set to "done"). The folding step is thus performed by the folder 23.

If the process step ID is "18", namely, the cutting step of the cutter 21 (the seventh process step in the workflow), the controller of the cutter 21 permits the cutter 21 to cut the sheets set by the operator (namely a bundle of recording sheets folded by the folder 23) on condition that the controller of the cutter 21 verifies that the process steps (the document input step, the preflight step, the proof outputting step, the page sequencing step, the printing step, and the folding step) prior to the process step of ID 18 in the process management information of the USB memory 201 have been completed (with all job status flags of the process steps prior to the process step ID 18 set to "done"). The cutting step is thus performed by the cutter 21.

If the process step ID is "22", namely, the binding step of the book binder 22 (the eighth process step in the workflow), the controller of the book binder 22 permits the book binder 22 to bind the sheets set on the book binder 22 (namely a bundle of recording sheets cut by the cutter 21) on condition that the controller of the book binder 22 verifies that the process steps (the document input step, the preflight step, the proof outputting step, the page sequencing step, the printing step, the folding step, and cutting step) prior to the process step of ID 22 in the process management information of the USB memory 201 have been completed (with all job status flags of the process steps prior to the process ID 22 set to "done"). The binding step is thus performed by the book binder 22.

If the process step ID is "25", namely, the delivery step of the PC 1 (the ninth and last process step in the workflow), the controller of the PC 1 permits the PC 1 to perform a delivery process on condition that the controller of the PC 1 verifies that the process steps (the document input step, the preflight step, the proof outputting step, the page sequencing step, the printing step, the folding step, the cutting step, and the binding step) prior to the process step of ID 25 in the process management information of the USB memory 201 have been completed (with all job status flags of the process steps prior to the process step ID 25 set to "done"). The delivery step is thus performed by the book binder 22. In the delivery step, the controller of the PC 1 instructs the user to deliver the finished product to the client, return the USB memory 201 to the client, and manage a delivery slip and delivery history.

The electrophotographic color copying apparatus 20 may have the cutting function, the book binding function, the folding function, the packaging function, and the collating function. In this case, the electrophotographic color copying apparatus 20 is optionally connected to a unit for performing a cutting process to recording sheets printed by the electrophotographic color copying apparatus 20, a book binding unit, a folding unit, a unit for packaging the recording sheets in a particular package, and a sorting unit for collating the recording sheets. Even if the same operation of inserting the USB memory 201 into the USB slot 302 of the electrophotographic color copying apparatus 20 is performed by the operator, the electrophotographic color copying apparatus 20 performs different process steps in response to the print process table 600 stored in the USB memory 201 (the process step ID 602 and the job status flag 603). More specifically, the electrophotographic color copying apparatus 20 performs the printing step if the process step ID is 15, performs the folding step if the process step ID is 19, performs the cutting step if the process step ID is 18, and performs the binding step if the process step ID is 22.

When the process step in step S1005 is completed, processing proceeds to step S1006 where the controller of the host device determines whether or not the process step has modified the print data. If it is determined that the print data has been modified (yes in step S1006), the controller stores the modified print data in the USB memory 201 in step S1007.

Processing proceeds to step S1008, and the data pointer 604 of the next process step is set to the head address of the modified data. Processing proceeds to step S1009. If the process step ID 11 is currently performed, the PC 1 has read the print data and has edited the read print data. In step S1006, therefore, the controller of the PC 1 determines that the print data has been modified (yes in step S1006), stores the edited print data in the USB memory 201 (step S1007), and modifies address setting to enable to read a next process step (step S1008).

If it is determined in step S1006 that the print data has not been modified, processing proceeds to step S1010. A next data pointer 604 is set to the same address as the current data pointer, and processing proceeds to step S1009. If the print data is not needed in the next process step, no data pointer setting is performed. If the preflight step of process step ID 9 is currently performed, the controller reads the input data as the print data from the USB memory 201 to perform the preflight step in step S1006, and the print data itself is not modified. The controller of the PC 1 determines the print data has not been modified (no in step S1006), and maintains the address setting (step S1010).

In step S1009, the controller updates the job status flag 603 of the current process step to "done" in the process management information of the USB memory 201. in step S1013, the controller of the host device urges the operator to pull out the USB memory 201. For example, a message reading "remove the USB memory from this device" is shown on the display of the host device (such as the display of the operation unit 412 of the electrophotographic color copying apparatus 20 or the monitor 510 of the PC 1). Furthermore, a next process step may be displayed based on the print process table 600 of the USB memory 201. FIG. 16 illustrates such a display.

FIG. 16 illustrates the display of the folder 23 displaying operation guidance. When the operator sets the USB memory 201 in the USB slot of the folder 23, the controller of the folder 23 checks the process management table stored in the USB memory 201 in the USB slot of the folder 23. When the controller of the folder 23 determines that the process step to be performed by the folder 23 is present in the workflow based on the process management information stored in the USB memory 201, in other words, when the controller of the folder 23 verifies the progress information of the workflow indicating that the process steps (the process step ID 1 through the process step ID 5) prior to the folding process of the folder 23 have been completed, in other words, all job status flags of the process steps prior to the folding step in the process management information of the USB memory 201 are set to "done", the display of the folder 23 presents a guidance display. FIG. 16 illustrates a guidance message, for example, reading "the folding step is completed" to notify the operator that the process step based on the process management information of the USB memory 201 has been completed. The controller of the host device notifies the operator what process step is performed by what device subsequent to the completion of the current process step. For example, FIG. 16 shows a message guidance reading "next is a cutting step." The controller also notifies the operator what action the operator should take next in the workflow. For example, guidance messages reading "remove USB memory from the folder" and "perform cutting step with USB memory and sheets of paper set in cutter" are also displayed. With this arrangement, the present invention allows a smooth printing operation. In the guidance message reporting process, the controller of the host device acquires the process management table stored in the USB memory 201 (such as the process management information and the progress information) and operational status information of each device that functions based on the process management information. For example, the operational status information indicates whether or not a process step has been completed. Based on the acquired information, the controller produces guidance information, and then provides the operator with the guidance information through an appropriate user interface unit such as an operation section of the host device.

When the controller of the host device detects that the USB memory 201 has been removed and the operator's acknowledgement has been confirmed, processing returns to step S1001. The removal of the USB memory 201 may be detected by a USB memory 201 detection sensor (not shown) in the USB slot. The user's acknowledgement is confirmed when the operator selects an "OK" button on the operational screen of the host device.

If the next process step is performed on the same device based on the print process table 600 in the USB memory 201, the controller allows the operator to determine whether to perform the next process step with the USB memory 201 remaining loaded. If the operator determines to perform the next process step, processing may return to step S1001 skipping step S1013 to perform the next process step.

In the above-referenced process step in step S1005, the CPU of the printer device having the USB memory 201 loaded therewithin performs the printing step in accordance with the process information of the print process table 600 read from the USB memory 201. Alternatively, the CPU of the printer device may display a command to perform the printing step on the display thereof, and in response, the operator may manually perform the printing process.

In the system of the first embodiment of the present invention, a plurality of devices work in cooperation to perform a plurality of process steps in a workflow to produce a final finished product in response to the client's request. The workflow, managed in the process management information, is executed by a correct device of the system at a correct timing. A removable medium such as the USB memory 201 stores the process management information that is scheduling information indicating what process step is performed by what device at what order of sequence. The removable medium also stores the progress information indicating what process steps of a plurality of process steps in the workflow are completed or and which process steps are uncompleted. The removable medium stores not only the process management information and the progress information but also the print data to be processed in the workflow. When the operator sets the removable medium in a read unit of a host device, the controller of the host device reads and examines the process management information and the progress information from the removable medium. The controller of the host device also reads the print data from the removable medium, thereby performing editing, modifying, printing processes, etc. on the print data.

When the operator inserts the removable medium in the read unit of the hose device, the controller of the host device reads and examines the process management information and the progress information from the inserted removable medium. If the controller of the host device determines that the process step of the host device is not present in the workflow scheduled based on the process management information (if it is determined that the operator operates an unrelated device in an attempt to perform a process step not needed in the workflow), the controller controls the operation section of the host device to notify the operator that the unrelated device should not be operated in the workflow. At the same time, the controller inhibits the host device from operating. This series of steps, corresponding to the report control process of FIG. 14, is a control process: no in step S1003→"error process 2" (step S1012) in FIG. 13.

As shown in FIG. 14, the workflow based on the process management information shown in FIGS. 8-11 needs no packaging process. If the USB memory 201 is set in the USB slot of the packager 24 (namely, yes in step S1001 of FIG. 13), the controller of the packager 24 reports to the operator the information that allows the operator to recognize that the packaging step of the packager 24 is not performed based on the process management information. The controller of the packager 24 inhibits the packager 24, which is an unrelated device in the workflow, from packaging the recording sheets (corresponding to a control process: no in step S1003→step S1012 as shown FIG. 13).

When the operator inserts the removable medium in the read unit of the host device, the controller of the host device reads the process management information and the progress information from the inserted removable medium. The controller of the host device may determine that the process step of the host device is not to be performed although the process step of the host device is set in the process management information. In other words, a process step having a job status flag of "not yet" is present prior to the current process. If the controller of the host device determines that the operator attempts to operate the host device regardless of the presence of an uncompleted process step that should have been completed prior to the process step of the host device, the controller causes the operation unit of the host device to report to the operator the information that the process of another device in the workflow is to be first performed before the process of the host device. The controller of the host device inhibits the host device from operating at this point in time. This control process, namely, yes in step S1003→no in step S1004→"error process 1" in step S1011, corresponds to the reporting control process of FIG. 15.

When the USB memory 201 is inserted in the USB slot of the cutter 21 (namely, yes in step S1001 of FIG. 13), the controller of the cutter 21 examines the process management information for each process step and the progress information (job status flag) stored in the USB memory 201 as shown in FIG. 15. Based on the result of the examination, the controller of the cutter 21 determines that the cutting step of the cutter 21 is required in the workflow scheduled based on the process management information (yes in step S1003 of FIG. 13). Furthermore, if the controller of the cutter 21 determines that the folding step of the folder 23 remains to be performed prior to the cutting step of the cutter 21 in the workflow (no in step S1004 of FIG. 13), in other words, if the controller of the cutter 21 determines the operator attempts to cause the cutter 21 to operate with the other process step remaining to be performed earlier, the controller of the cutter 21 reports to the operator through the operation unit of the cutter 21 the information that allows the operator to recognize that the folder 23 must perform the folding step before the cutting operation. The controller of the cutter 21 inhibits the cutter 21 from performing the cutting operation before the folder 23 performs the folding step (step S1011).

When the operator inserts the removable medium in the read unit of the host device, the controller of the host device reads the process management information and the progress information from the inserted removable medium. The controller of the host device examines the process management information and the progress information. If the controller of the host device determines that the process step of the host device needs to be performed (in other words, is registered in the workflow) and that other process steps to be performed prior to the process step of the host device have been completed (with the job status flags thereof set to "done"), the controller of the host device permits and causes the host device to perform the process step in the workflow at this point of time (step S1005). Upon verifying that the operation of the host device is completed, the controller of the host device controls the operation unit of the host device to notify the operator of the completion of the process step. By checking the content of the process management information of the USB memory 201 of the host device, the controller of the host device controls the display unit of the host device to notify the operator what process step is to be performed next after the completion of this process step in the workflow. The controller of the host device notifies the operator through the operation unit of the host device what action the operator is to perform at what location after the completion of the current process step in the workflow. The series of steps, namely, yes in step S1003→yes in step S1004→process step in step S1005 in FIG. 13, corresponds to the reporting control process of FIG. 16.

When the USB memory 201 in the USB slot is inserted in the USB slot of the folder 23 (namely, yes in step S1001 of FIG. 13), the controller of the folder 23 examines the process management information for each process step and the progress information (job status flag) stored in the USB memory 201 as shown in FIG. 16. Based on the result of the examination, the controller of the cutter 21 determines that the folding step of the folder 23 is required in the workflow scheduled based on the process management information (yes in step S1004 of FIG. 13). Furthermore, if the controller of the folder 23 determines that all process steps required in the workflow prior to the folding step of the folder 23 have been completed (namely, yes in step S1004 of FIG. 13), in other words, determines that the operator operates the folder 23 to perform the folding step with all prior processes in the workflow completed, the controller of the folder 23 permits and causes the folder 23 to perform the folding step in the workflow based on the process management information at this point of time (step S1005). Upon detecting the completion of the folding step in accordance with the status information and job process, the controller of the folder 23 controls the operation unit of the folder 23 to notify the operator of the completion of the folding step. Based on the process management information of the USB memory 201 set in the host device, the controller controls the operation unit of the folder 23 to notify the operator that the next process step to perform immediately subsequent to this process step is a cutting step of the cutter 21. The controller of the folder 23 controls the operation unit of the folder 23 to notify the operator of the next action the operator should take. Here, the operator must remove the recording sheets folded by the folder 23, and the USB memory 201 from the folder 23, and set the recording sheets and the USB memory 201 to the cutter 21.

The system of the first embodiment of the present invention thus constructed provides the advantages described below.

The CPU of the host device with the USB memory 201 loaded therein notifies the operator of the next process step (the device performing the next process step) based on the print process table 600 read from the USB memory 201. Even inexperienced operators perform the printing process in an error free manner.

The device is controlled to perform the process step based on the process management information in the print process table 600 read from the USB memory 201. More specifically, the CPU 501 of the PC 1 modifies the process step based on the process management information in the print process table 600 (for example, from the process step number 1 to the preflight step, from the process step number 2 to the proof outputting step, or from the process step number 3 to the page sequencing step). Even an inexperienced operator can successively perform printing process steps.

The controller of each host device controls the host device to permit or restrict and/or perform printing process steps (including not only an actual printing step, but also post-print steps such as a cutting step for cutting printed recording sheets, a folding step, and a binding step, and pre-print steps performed prior to the actual printing including a preflight step and a page sequencing step) based on the information of the print process table 600 read from the USB memory 201. The CPU of each device enables the device to perform a respective process step as long as the USB memory 201 is loaded in a correct device, and as long as the CPU determines a process step to be performed as a correct process step.

If the CPU of the device having the USB memory 201 loaded therewithin determines that the host device must not perform the process step on the print data stored in the USB memory 201 based on the process step table read from the USB memory 201, the CPU notifies the operator of a device to be used next by displaying the display of the host device.

Even an inexperienced operator can easily determine a next device.

Second Embodiment

In accordance with the first embodiment of the present invention, a next process step is not executed unless the next process step is set as a next job item in the print process table 600 of the USB memory 201. Alternatively, a notice may be displayed on the display of a device if the next process step is not registered as a next job item. In a second embodiment, a device that manages the entire system is notified of the next process step unregistered in the print process table 600 but the next process step itself is performed by the host device.

Figure 17:
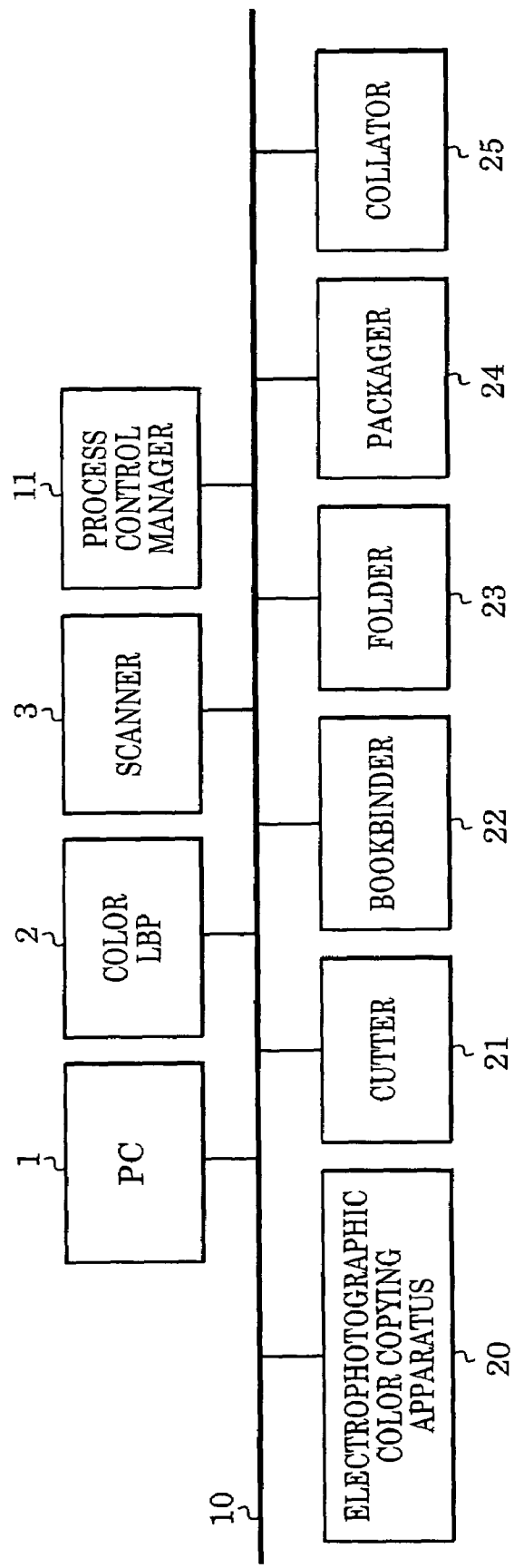
FIG. 17 is a block diagram illustrating a system incorporating a print processing apparatus, such as an information processing apparatus, an image forming apparatus, or a post-process apparatus in accordance with a second embodiment of the present invention.

FIG. 17 is a block diagram illustrating a system incorporating a print processing apparatus, such as an information processing apparatus, an image forming apparatus, or a post-process apparatus in accordance with the second embodiment of the present invention. Elements identical to those described with reference to FIG. 1 are designated with the same reference numerals and are not described in detail here as they are described above.

As shown, a process control manager 11 manages all process steps in the printing system.

In accordance with the second embodiment of the present invention, the network 10 is connected to each of the electrophotographic color copying apparatus 20, the cutter 21, the book binder 22, the folder 23, the packager 24, and the collator 25.

Figure 18:
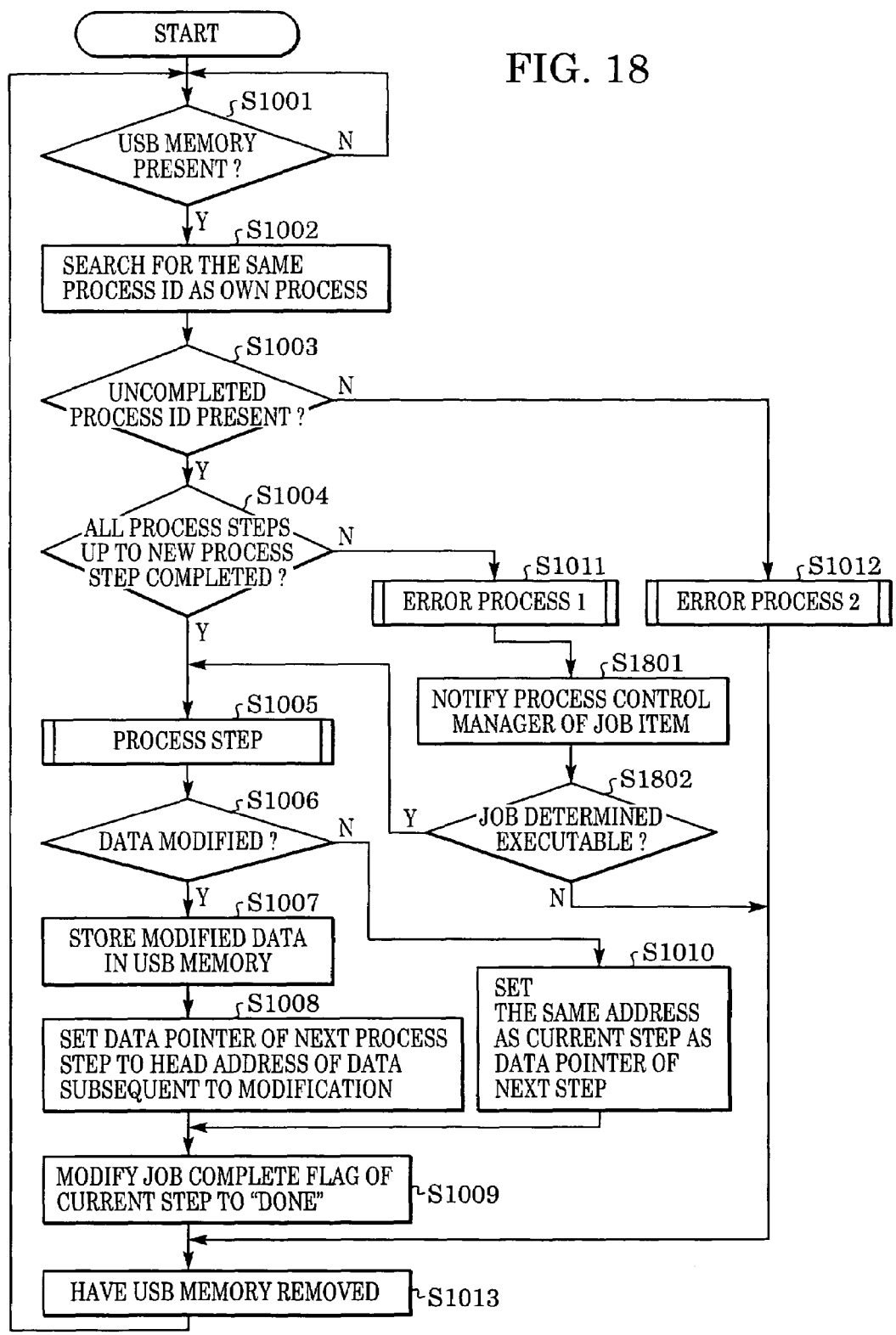
FIG. 18 is a flowchart of a second control process of the printing system of the second embodiment of the present invention.

FIG. 18 is a flowchart of a second control process of the printing system of the second embodiment of the present invention. The flowchart of FIG. 18 represents an operation carried out by the electrophotographic color copying apparatus 20, the cutter 21, the book binder 22, the folder 23, the packager 24, and the collator 25 in accordance with the process management information in the USB memory 201. The steps in the flowchart of FIG. 18 are performed by the controllers of the PC 1, the electrophotographic color copying apparatus 20, the cutter 21, the book binder 22, the folder 23, the packager 24 and the collator 25 shown in FIG. 1 in accordance with the programs stored in the respective HDDs or any other storage media. The processes performed for the job items listed in FIG. 8 are basically identical to each other. S1001-S1013 and S1801-S1802 represent step numbers, and steps identical to those described in FIG. 13 (S1001-S1013) are designated with the same step numbers and are not described in detail here because they are described above.

If it is determined in step S1004 that not all process steps prior to a preceding step have been completed, the host device performs an "error process 1" in step S1011. In step S1801, the host device notifies the process control manager 11 of information concerning a current job item and a job item to be processed next, and waits on standby for a reply from the process control manager 11.

The process control manager 11 compares the current job item with the job item to be processed next. If the current job item cannot be performed first (for example, in such a case as where a delivery step is attempted prior to a binding step), the process control manager 11 notifies the reporting device of an operation inexcutable status (error). If the current job item can be performed first (for example, in such a case where a preflight step is attempted prior to a job slip input), the process control manager 11 notifies the reporting device of an operation executable status.

Upon receiving the reply from the process control manager 11, the device determines in step S1802 whether or not the reply represents the operation executable status. If it is determined that the reply represents the operation inexcutable status, processing proceeds to step S1013.

If it is determined that the reply represents the operation executable status, processing proceeds to step S1005.

Even if the operator makes a mistake in the order of process sequence (or a subsequent process step is attempted because of a busy device), that process step is permitted for production efficiency if possible.

The print data may be stored and managed in a file server (not shown) over the network 10 with a password, and the USB memory 201 stores only the print process table 600 (with the data pointer 604 holding information indicating the location of the print process table 600 in the filter server).

Third Embodiment

In accordance with the first embodiment of the present invention, the USB memory 201 and the print order writing software are distributed to a client, and the client causes the USB memory 201 to store input data. The USB memory 201 is then received from the client. In a third embodiment, a device receives, via the Internet, input data and order content transmitted by the client. The device that has received the input data and the order content writes the input data and the order content to the USB memory 201. The third embodiment is described below.

Figure 19:
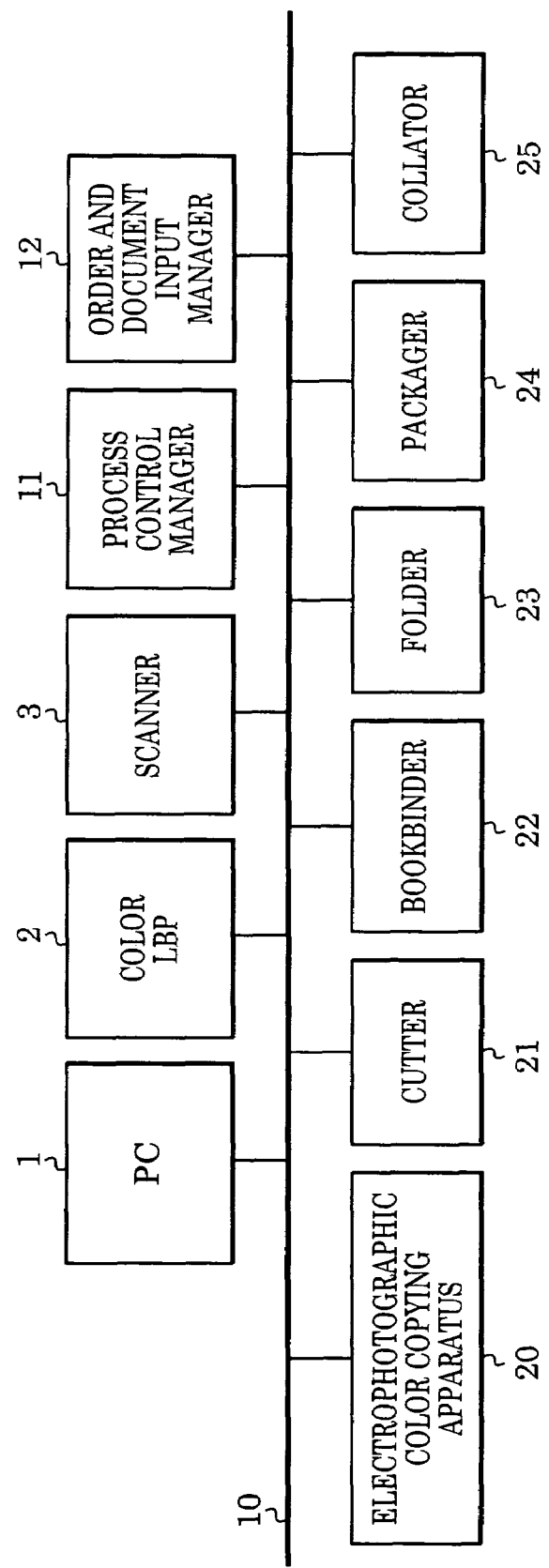
FIG. 19 is a block diagram illustrating a system incorporating a print processing apparatus, such as an information processing apparatus, an image forming apparatus, or a post-process apparatus in accordance with a third embodiment of the present invention.

FIG. 19 is a block diagram illustrating a system incorporating a print processing apparatus, such as an information processing apparatus, an image forming apparatus, or a post-process apparatus in accordance with the third embodiment of the present invention. Elements identical to those described with reference to FIG. 17 are designated with the same reference numerals and are not described in detail here as they are described above.

An order and document input manager 12 receives a job via the Internet. The order and document input manager 12, as an intermediary for electronic commerce (EC), is a computer for ordering placing and order receiving. If viewed from the user side, the order and document input manager 12 is like an electronic online store on a web page over the Internet. The order and document input manager 12 performs user authentication, and a user sends electronic data together with a desired file at a desired setting to the order and document input manager 12 for ordering a job.

Upon receiving a job, the order and document input manager 12 instructs the user to load the USB memory 201 into the order and document input manager 12. With the USB memory 201 loaded, the order and document input manager 12 stores the input document data and the order content in the USB memory 201. The USB memory 201 has the content as shown in FIG. 8.

The order and document input manager 12 stores the input document data and the order content in the USB memory 201 without a password. However, the input document data ordered and held in the order and document input manager 12 is protected with a password, etc., and unauthorized access is thus prevented.

Even when the ordering and document inputting are performed in EC, the printing process is quickly performed using the USB memory 201. This arrangement responds to ordering from a remote place.

In the print process table 600 shown in FIGS. 8-11, the process step ID corresponding to the respective process step number 601 is simply written. A column for designating the device may be added to the print process table 600. The client or the process manager may designate a device or the type of the device for performing the job so that any device different from that device or any device of type other than that type is disabled to perform the process or so that a notice about the device or the type of the device is displayed.

In the color printing, in particular, the type of a printer or the model of a printer may be identified to maintain consistency in color.

To manage the devices designated by the process control manager 11 and to prevent a plurality of operators from waiting for a single busy device, each device inquires from the process control manager 11 regarding the device expected to perform the next process step when the current process step has been completed. The print process table 600 is then updated so that a device having a smaller number of waiting jobs is designated. In this way, devices in use are evenly and efficiently used.

The print process table 600 and the print data are stored in the USB memory 201 in each of the preceding embodiments of the present invention. The removable medium is not limited to the USB memory 201. Any removable medium is perfectly acceptable as long as the removable medium is a rewritable, detachably mounted, and a portable type storage medium (storage device), and permits a particular device only or a particular person only to access thereto with an authentication function. For example, the removable medium may be a magneto-optical disk, a compact disk rewriteable (CD-RW), digital versatile disk rewriteable (DVD-RW), or any of a variety of memory cards.

The preferred embodiments have been discussed. The present invention may be embodied in the form of a system, an apparatus, a method, a computer program, or a storage medium. The present invention is applicable to a system containing a plurality of apparatuses, or a single apparatus.

A combination of the preceding embodiments in part or in whole falls within the scope of the present invention.

In accordance with the previously discussed embodiments of the present invention, the print data and the process management information are stored in a portable storage medium such as a USB flash memory. The portable storage medium is loaded in a device that performs at least one of process steps (including a comprehensive outputting step, a proof outputting step, a preflight check step, a RIP step, a page sequencing step, a printing step, a cutting step, a collating step, and a book binding step). The process management information is read from the loaded portable storage medium. Based on the read process management information, a process step may be displayed on a display, such as an LCD. A process step failing to match the process management information is limited (for example, printing is inhibited). The confidentiality of the print data is protected and the process step management is thus performed.

The CPU of each device limits the process of a next process step if the next process step is not to be performed based on the print step table read from the USB memory that stores data of an order sheet and the process management information. Even an operator at a low skill level can perform a reliable printing process. The security of the data is heightened using the authentication function of the memory device. This arrangement prevents leakage of the print data, useless printing, and erroneous operation. Even a low-skilled operator can provide a sophisticated printing service.

Printout improved in finish accuracy and color consistency in color printing is provided by designating the device on a per order sheet basis.

In each of the previously described embodiments of the present invention, the system includes the computer 1, the scanner 3, the image forming apparatuses 2 and 20, and a plurality of sheet processing devices 21-25 for processing the sheets bearing images. In addition to these devices, other devices, such as a digital camera and a notebook computer may be included in the system. The present invention is applicable to a system that contains at least several of these devices.

A workflow is scheduled in a manner such that a digital camera, if included in the system, photographs a subject, the PC 1 edits image data of the image of the subject, and the LBP 2 prints the edited image data. The system now performs the workflow. In the same manner as the previously described embodiments, the above control process is performed using the removable medium. For example, the process management table, scheduled to have process step numbers with the image pickup process of the digital camera assigned with a first process step, the editing step of the PC 1 assigned with a second process step, and the printing step of the LBP 2 assigned with a third process step, is produced and stored in the removable medium. Each time any of the image pickup step of the digital camera, the editing step of the PC 1, and the printing step of the LBP 2 is performed, the job status flag of each process step in the process management table of the removable medium is updated.

Based on at least the process management information and in addition, the progress information stored in the removable medium, the controller of the electrophotographic color copying apparatus 20 now determines that the operator attempts to operate the electrophotographic color copying apparatus 20 in the workflow, namely, a device other than the digital camera, the PC 1 and the LBP 2, from among a plurality of devices in the system. The controller of the electrophotographic color copying apparatus 20 inhibits the electrophotographic color copying apparatus 20 from performing a copying step. For example, the controller of the electrophotographic color copying apparatus 20 presents error guidance information such as the information shown in FIG. 14 and displayed on the operation screen (for example, a message reading "copying step is not performed by the copying apparatus in this job") on the operation unit of the electrophotographic color copying apparatus 20. This control process is performed in a series of steps: no in step S1003→step S1012 in FIG. 13.

Based on the process management information and the progress information (in particular, the content of the job status flag indicated by the progress information) in the workflow stored in the removable medium, the controller of the LBP 2 now determines that the operator operates the LBP 2 in an attempt to perform the printing step of the data of the digital camera with the editing step of the PC 1 uncompleted (with the job status flag of the editing step of the PC 1 set to "not yet") and with the image pickup step of the digital camera completed (with the job status flag of the image pickup step of the digital camera set to "done"). The printing step of the LBP 2 is contained in the workflow. Since the editing step of the PC 1 is uncompleted, the controller of the LBP 2 inhibits the LBP 2 from performing the printing step at this point in time. For example, the controller of the LBP 2 presents error guidance information such as the information displayed on the operation screen of FIG. 15 (for example, a message reading "in this job, the editing step of the PC 1 must be performed prior to the printing step of the LBP 2, and perform the editing step of the pickup image with the USB memory storing the image data from the digital camera set") on the operation unit of the LBP 2. This control process corresponds to a series of steps: yes in step S1003→no in step S1004→"error process 1" in step S1011 in FIG. 13.

The operator now attempts to edit the image data picked up in the image pickup step by operating the PC 1 after the image pickup step of the digital camera. Based on the process management information and the progress information in the workflow stored in the removable medium, the controller of the PC 1 verifies that the workflow is performed using the appropriate device in the appropriate order of sequence. The controller of the PC 1 thus permits the PC 1 to perform the editing step on the image data in the USB memory 201. In response to the completion of the editing step, the controller of the PC 1 reports to the operator guidance information, such as that displayed on the operational screen of FIG. 16, through the operation unit of the PC 1. The guidance information may include information indicating the completion of the editing step; (for example: "The editing step has been completed. The next step is a printing step of the LBP 2. Perform the printing step with the USB memory 201 set in the USB memory 201"); information for causing the operator to recognize what process step is performed in the next device; and information for causing the operator to recognize what action the operator must take subsequent to the editing step. This control process corresponds to: yes in step S1003→yes in step S1004→process step in step S1005.

In accordance with each of the previously described embodiments (the first embodiment, in particular), the system and the devices are arranged and perform the control process as generally described below.

For example, the system includes a plurality of devices including a first device that performs a first process based on information stored in a portable storage unit that stores a plurality of pieces of data, and a second device that performs a second process based on the information stored in the portable storage unit. The storage unit is, for example, a removable medium such as the USB memory, a magneto-optical disk, a CD-RW, or a DVD-RW. The information stored in the portable storage unit includes at least one of the process management information relating to the workflow responding to a request from the client, and the progress information relating to the progress of each process step, and the image data to be printed. The first device, for example, includes at least one of the computer 1, the scanner 3, the image forming apparatuses 2 and 20, the sheet processing apparatuses 21-25 for processing the sheets bearing images, the digital camera, and the notebook computer. The second device, for example, is any one of the above devices except that serving as the first device. In the system, the controller (for example, CPU of one of the plurality of devices in the system) controls a workflow including a process to make the second device execute the second process after (subsequent to) the first process has been executed (performed) by the first device. In the system, the controller (for example, CPU of one of the plurality of devices in the system) controls a user interface unit so as to report (notify or guide or inform) to the operator (worker) of the system, based on the information stored in the portable storage unit, information relating to actions to be carried out by the operator in a series of work period (a job period) including a period from the timing of the end of the first process performed by the first device to the timing of the start of the second process performed by the second device, when the controller causes the second device to execute the second process after (subsequent to) the first process is executed (performed) by the first device. The job period (series of work period) is, for example, a series of work period including a period from the end (completion) of the folding process by the folder 23 to the start of the cutting process by the cutter 21 as shown in FIG. 16. The information relating to actions to be carried out by the operator is the guidance information reported on the operation screen of FIG. 16. The information stored in the portable storage unit is the process management information and the progress information, stored in the removable medium. The user interface unit is an operation section of a liquid-crystal operation panel (not shown) of the folder 23 shown in FIG. 16.

The system includes a plurality of devices including at least one of a first device (for example, at least one of the computer 1, the scanner 3, the image forming apparatuses 2 and 20, the sheet processing apparatuses 21-25 for processing the sheets bearing images, the digital camera, and the notebook computer) that performs a first process, a second device (for example, any of the devices listed above except the first device) that performs a second process, and a third device (for example, any of the devices listed above except the devices serving as the first and second devices) that performs a third process. In the system, the controller (for example, the CPU of one of the plurality of devices in the system), for example, confirms information (the process management information and the progress information in a workflow) relating to a workflow in which the second process is performed by the second device after the first process is performed by the first device, based on information stored in the storage medium. In the case of the above-mentioned situation, the controller, for example, permits an execution of the second process by the second device subsequent to the first process performed by the first device in the workflow, based on result confirmation of the information relating to the workflow of the storage medium (in a control process: yes in step S1004→process step in S1005 in FIG. 13). And the controller, for example, inhibits an execution of the second process by the second device prior to the first process being performed by the first device in the workflow based on a result confirmation of the information relating to the workflow of the storage medium (in a control process: no in step S1004→"error process 1" in step S1011 in FIG. 13).

Moreover, in the above-mentioned situation, the controller, for example, inhibits an execution of the third process by the third device in the workflow, based on a result confirmation of the information relating to the workflow of the storage medium (in a control process: no in step S1003→"error process 2" in step S1012).

The above-referenced control processes are possible if any of the plurality of devices in the system is used.

The user interface unit is used as a display unit displaying a variety of information to the operator. An audio unit for outputting audio may be used. Any type of user interface unit may be used as long as the user interface unit reliably notifies the operator of information intended for the operator.

The above control processes are executed in the system of the apparatuses. Even if a mix of various types of devices having a variety of structures is contained in the system, an operational flexibility is assured. The embodiments of the present invention are applicable to devices and systems in any configuration, and still provide advantages of the present invention.

Referring to a memory map of FIG. 20, the structure of a data processing program read by the printing system of the present invention is discussed next.

Figure 20:
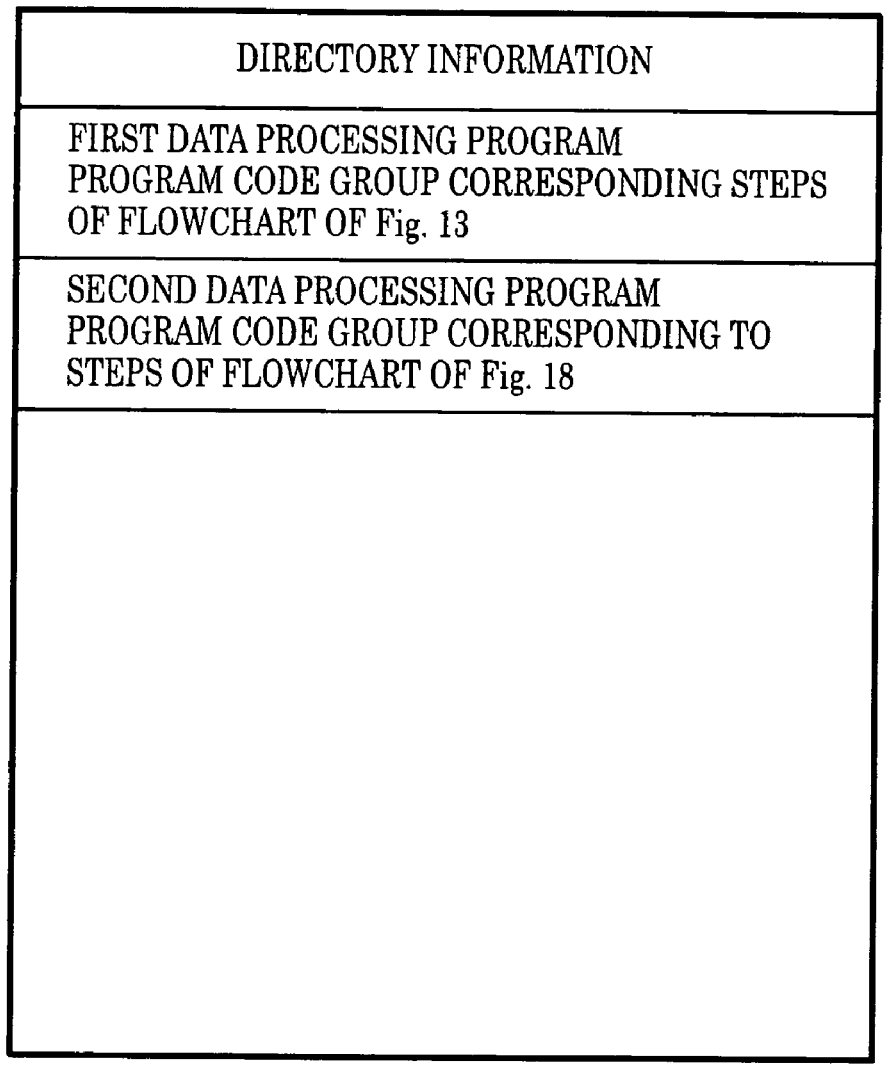
FIG. 20 illustrates a memory map of a storage medium storing a variety of data processing programs read by the printing system of the embodiments of the present invention.

FIG. 20 illustrates the memory map of a storage medium storing a variety of data processing programs read by the printing system of the embodiments of the present invention.

Information managing a group of programs stored in the storage medium, such as version information and producer's information, although not shown, may also be stored. Furthermore, information dependent on a program reading side OS, such as an icon identifying a program, may also be stored.

Data attached to each program is also managed in directories. If a program for installing a variety of programs onto a computer and a program to be installed onto the computer are compressed, a decompression program may also be stored.

The functions illustrated in FIG. 13 or 18 may be executed by a host computer under the control of a program installed from the outside into the host computer. A group of pieces of information including the program is supplied to an output device from a storage medium, such as a CD-ROM, a flash memory, a floppy disk, or via a network from an outside storage medium. Such an arrangement falls within the scope of the present invention.

A storage medium storing program code of the software program performing the functions of the present invention is installed in a system or an apparatus, and a computer (CPU or micro-processing unit (MPU)) of the system or the apparatus reads and executes the program code stored in the storage medium.

The program code read from the storage medium perform the functions of the present invention.

The form of the programs is not important as long as the program performs the function thereof. The program may be object code, a program performed by an interpreter, or script data supplied to the OS.

Available as storage media for supplying the program code are a flexible disk, a hard disk, an optical disk, a magneto-optical disk, a CD-ROM, a CD-R, a CD-RW, a magnetic tape, a nonvolatile memory card, ROM, DVD and the like.

A client computer is connected to the Internet and accessing a home page using a browser of the client computer. The program of the embodiments of the present invention, or a file containing compressed program with an automatic install function may be downloaded to a recording medium such as a hard disk. Program code constituting the program of the embodiments of the present invention is divided into a plurality of files, and the files may be downloaded from respective different home pages. A world wide web (WWW) server and a file transfer protocol (FTP) server for downloading, to a plurality users, the program files for causing the computer to perform the processes of the functions of the embodiments of the present invention also fall within the scope of the present invention.

A CD-ROM storing the computer programs of the embodiments of the present invention in an encrypted form thereof is distributed to users. Key information for decrypting the computer program is downloaded from a home page via the Internet to a user who satisfies a predetermined condition. The user decrypts the computer program with the key information and installs the computer program onto the computer.

By executing the program code ready by the computer, the functions of the embodiments are performed. Furthermore, the operating system (OS) running on the computer performs partly or entirely a process in response to the instructions of the program code, and with the process performed, the functions of the above-described embodiments are performed.

The program code from the storage medium is read into a memory incorporated in a feature expansion board in the computer or in a feature expansion unit connected to the computer. The CPU mounted on the feature expansion board or the feature expansion unit performs partly or entirely the actual process in response to the instructions from the program code. The functions of the above embodiments are executed through the process. Such program code falls within the scope of the present invention.

The present invention is applicable to a system including a plurality of apparatuses, or a single apparatus. The present invention is achieved by supplying the computer program to the system or the apparatus. The system or the apparatus provides the advantages of the present invention by reading the software program of the present invention from a storage medium.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for processing a job that a predetermined processing and another predetermined processing are performed sequentially, the predetermined processing being performed by a predetermined device, the other predetermined processing being performed by another predetermined device separated from the predetermined device, wherein the predetermined device and the other predetermined device can detachably load a portable recording medium, the other predetermined device comprising:
    a determining unit configured to determine, based on information related to progress about the job recorded on the portable recording medium by the predetermined device, if the predetermined processing about the job by the predetermined device has been done; and
    a control unit configured to control the other predetermined device to perform the other predetermined processing about the job, if it is determined that the predetermined processing about the job by the predetermined device has been done,
    wherein the control unit controls the other predetermined device not to perform the other predetermined processing about the job, if it is not determined that the predetermined processing about the job by the predetermined device has been done.

2. The system according to claim 1, wherein the predetermined device comprises a unit configured to update the information related to progress about the job recorded on the portable recording medium, if the predetermined processing about the job by the predetermined device has been done.

3. The system according to claim 1, wherein the system further comprises a unit configured to notify an operator of guidance information based on the information related to progress about the job recorded on the portable recording medium.

4. The system according to claim 1, wherein the system further comprises a unit configured to control so that the predetermined processing or the other predetermined processing is not performed by a different device irrelevant to the job, based on the information related to progress about the job recorded on the portable recording medium.

5. The system according to claim 1, wherein the system further comprises a unit configured to distinguish an operator based on the information related to progress about the job recorded on the portable recording medium.

6. The system according to claim 1, wherein the system further comprises a unit configured to restrict user operation in the predetermined device or the other predetermined device based on the information related to progress about the job recorded on the portable recording medium.

7. The system according to claim 1, wherein the portable recording medium can record at least print data.

8. The system according to claim 7, wherein the portable recording medium is a removable medium as a storage unit configured to store electronic data.

9. The system according to claim 1, wherein the predetermined device is at least one of a computer, a scanner, a printer, an apparatus utilized in postpress a digital camera, and a notebook computer.

10. A system for processing a job that a predetermined processing and another predetermined processing are performed sequentially, the predetermined processing being performed by a printing device, the other predetermined processing being performed by another predetermined device separated from the printing device, the other predetermined device being utilized in prepress or postpress, wherein the predetermined device and the other predetermined device can detachably load a portable recording medium, the other predetermined device comprising:
    a determining unit configured to determine, based on information related to progress about the job recorded on the portable recording medium by the pinting device, if the predetermined processing about the job by the printing device has been done; and
    a control unit configured to control the other predetermined device to perform the other predetermined processing about the job, if it is determined that the predetermined processing about the job by the printing device has been done,
    wherein the control unit controls the other predetermined device not to perform the other predetermined processing about the job, if it is not determined that the predetermined processing about the job by the printing device has been done.

11. A system for processing a job that a predetermined processing and another predetermined processing are performed sequentially, the predetermined processing being performed by a predetermined device, the other predetermined processing being performed by another predetermined device separated from the predetermined device, wherein the predetermined device and the other predetermined device can detachably load a portable recording medium, the other predetermined device comprising:
    a determining unit configured to determine, based on information related to progress about the job recorded on the portable recording medium by the predetermined device, if the predetermined processing about the job by the predetermined device is not yet done; and a control unit configured to cause a notification unit to output warning information so that the other predetermined processing is not performed by the other predetermined device if it is determined that the predetermined processing about the job by the predetermined device is not yet done.

12. The system according to claim 11, wherein the portable recording medium can record at least print data.

13. The system according to claim 12, wherein the portable recording medium is a removable medium as a storage unit configured to store electronic data.

14. A method for processing a job that a predetermined processing and another predetermined processing are performed sequentially, the predetermined processing being performed by a predetermined device, the other predetermined processing being performed by another predetermined device separated from the predetermined device, wherein the predetermined device and the other predetermined device can detachably load a portable recording medium, the method comprising:
   determining, based on information related to progress about the job recorded on the portable recording medium by the predetermined device, if the predetermined processing about the job by the predetermined device has been done;
   controlling the other predetermined device to perform the other predetermined processing about the job, if it is determined that the predetermined processing about the job by the predetermined device has been done; and
   controlling the other predetermined device not to perform the other predetermined processing about the job, if it is not determined that the predetermined processing about the job by the predetermined device has been done.

15. A computer-readable storage medium storing a program for causing a computer to execute a method defined in claim 14.

16. A method for processing a job that a predetermined processing and another predetermined processing are performed sequentially, the predetermined processing being performed by a printing device, the other predetermined processing being performed by another predetermined device separated from the printing device, the other predetermined device being utilized in prepress or postpress, wherein the predetermined device and the other predetermined device can detachably load a portable recording medium, the method comprising:
   determining, based on information related to progress about the job recorded on the portable recording medium by the printing device, if the predetermined processing about the job by the printing device has been done;
   controlling the other predetermined device to perform the other predetermined processing about the job, if it is determined that the predetermined processing about the job by the printing device has been done; and
   controlling the other predetermined device not to perform the other predetermined processing about the job, if it is not determined that the predetermined processing about the job by the printing device has been done.

17. A computer-readable storage medium storing a program for causing a computer to execute a method defined in claim 16.

18. A method for processing a job that a predetermined processing and another predetermined processing are performed sequentially, the predetermined processing being performed by a predetermined device, the other predetermined processing being performed by another predetermined device separated from the predetermined device, wherein the predetermined device and the other predetermined device can detachably load a portable recording medium, the method comprising:
   determining, based on information related to progress about the job recorded on the portable recording medium by the predetermined device, if the predetermined processing about the job by the predetermined device is not yet done; and
   causing a notification unit to output warning information so that the other predetermined processing is not performed by the other predetermined device if it is determined that the predetermined processing about the job by the predetermined device is not yet done.

19. A computer-readable storage medium storing a program for causing a computer to execute a method defined in claim 18.

20. A device configured to perform processing about a job that a predetermined processing and another predetermined processing are performed sequentially, the predetermined processing being performed by another predetermined device separated from the device, wherein the device and the other predetermined device can detachably load a portable recording medium, the device comprising:
   a processing unit configured to perform the other predetermined processing about the job;
   a determining unit configured to determine, based on information related to progress about the job recorded on the portable recording medium by the other predetermined device has been done; and
   a control unit configured to control so that the other predetermined processing about the job by the processing unit is performed, if it is determined that the predetermined processing about the job by the other predetermined device has been done,
   wherein the control unit controls so that the other predetermined processing about the job by the processing unit is not performed if it is determined that the predetermined processing about the job by the other predetermined device is not yet done.

21. A device configured to perform processing about a job that a predetermined processing and another predetermined processing are performed sequentially, the predetermined processing being performed by another predetermined device separated from the device, the other predetermined processing being processing about printing processes or postpress, the device and the other predetermined device can detachably load a portable recording medium, the device comprising:
   a processing unit configured to perform the other predetermined processing about the job; and
   a control unit configured to control, based on information related to process flow about the job recorded on the portable recording medium by the other predetermined device, the processing unit to perform the other predetermined processing about the job after performing the predetermined processing about the job by the other predetermined device.

22. A device configured to perform processing about a job that a predetermined processing and another predetermined processing are performed sequentially, the predetermined processing being performed by another predetermined device separated from the device the device and other predetermined device can detachably load a portable recording medium, the device comprising:
   a processing unit configured to perform the other predetermined processing about the job; and a determining unit configured to determine, based on information related to progress about the job recorded on the portable recording medium by the other predetermined device, if the predetermined processing about the job by the predetermined device has been done; and
a control unit configured to cause a notification unit to output warning information so that the other predetermined processing about the job by the processing unit is not performed if it is determined that the predetermined processing about the job by the other predetermined device is not yet done.

* * * * *